(12) United States Patent  
Joseph et al.

(10) Patent No.: US 7,716,595 B2  
(45) Date of Patent: May 11, 2010

(54) CALL CENTER SUPPORT AND DOCUMENTATION SYSTEM

(75) Inventors: Daniel Joseph, Karnataka (IN);  
Manjunath Shamaiah, Karnataka (IN);  
Samrat Dasgupta, Karnataka (IN);  
Usha Dharmarajan, Karnataka (IN)

(73) Assignee: Accenture Global Services GmbH, Schaffhausen (CH)

( * ) Notice: Subject to any disclaimer, the term of this patent is extended or adjusted under 35 U.S.C. 154(b) by 210 days.

(21) Appl. No.: 11/413,697

(22) Filed: Apr. 28, 2006

(65) Prior Publication Data

US 2007/0036329 A1    Feb. 15, 2007

Related U.S. Application Data

(60) Provisional application No. 60/678,268, filed on May 5, 2005.

(51) Int. Cl.  
*G06F 3/00* (2006.01)

(52) U.S. Cl. .................. 715/753; 715/705; 715/709; 715/714; 715/758; 715/759

(58) Field of Classification Search .................. 715/705, 715/709, 712, 714, 753, 758, 759, 780  
See application file for complete search history.

(56) References Cited

U.S. PATENT DOCUMENTS

| | | | | |
|---|---|---|---|---|
| 5,757,904 A * | 5/1998 | Anderson | ............... | 379/265.06 |
| 5,940,077 A * | 8/1999 | Amro | ......................... | 715/800 |
| 6,100,891 A * | 8/2000 | Thorne | ....................... | 715/854 |
| 6,591,258 B1 * | 7/2003 | Stier et al. | ..................... | 706/50 |
| 6,621,412 B1 * | 9/2003 | Markle et al. | ............... | 340/517 |
| 2002/0059269 A1 * | 5/2002 | McQuown et al. | .......... | 707/100 |
| 2003/0177009 A1 * | 9/2003 | Odinak et al. | ............... | 704/260 |
| 2004/0078446 A1 * | 4/2004 | Daniell et al. | ............... | 709/206 |
| 2005/0278340 A1 * | 12/2005 | Rehberg et al. | ............... | 707/10 |
| 2006/0080606 A1 * | 4/2006 | Lortscher et al. | ............ | 715/705 |
| 2006/0174167 A1 * | 8/2006 | Ito | ............................... | 714/48 |
| 2007/0206086 A1 * | 9/2007 | Baron et al. | ............. | 348/14.01 |

* cited by examiner

*Primary Examiner*—Weilun Lo  
*Assistant Examiner*—Rashedul Hassan  
(74) *Attorney, Agent, or Firm*—Brinks Hofer Gilson & Lione

(57) ABSTRACT

A call center support and documentation system is provided. The call center support and documentation system assists an agent of a call center in processing calls. Specifically, the system assists the agent in processing calls more quickly by providing, on a single display screen, all of the information to process a call (including the customer's information, troubleshooting steps, and documentation). The system also assists the agent in documenting calls in an efficient and standardized manner. Documentation, such as the customer information and troubleshooting steps for a call, may be automatically populated in a uniform manner so that the agent may update the documentation database.

22 Claims, 32 Drawing Sheets

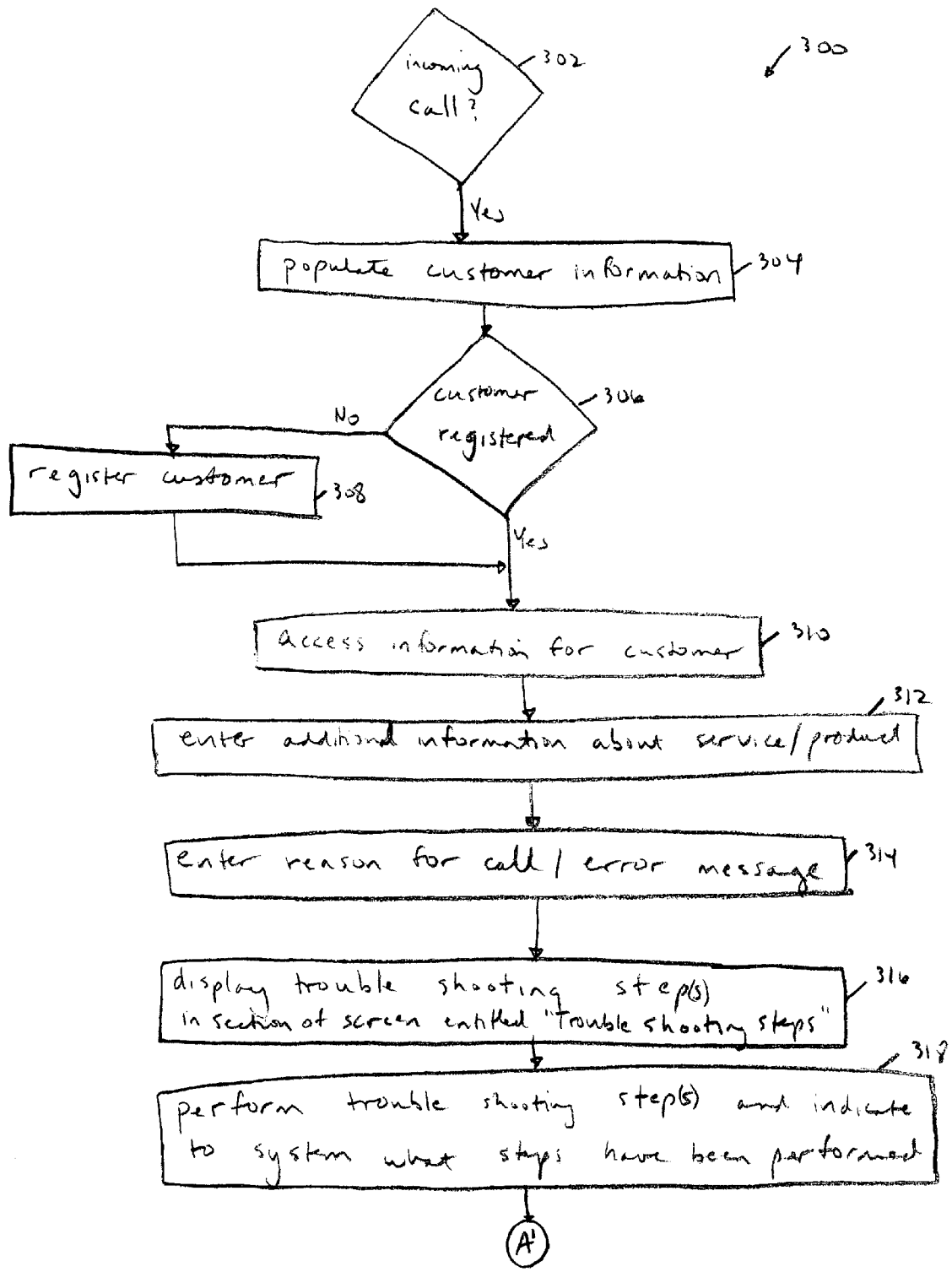

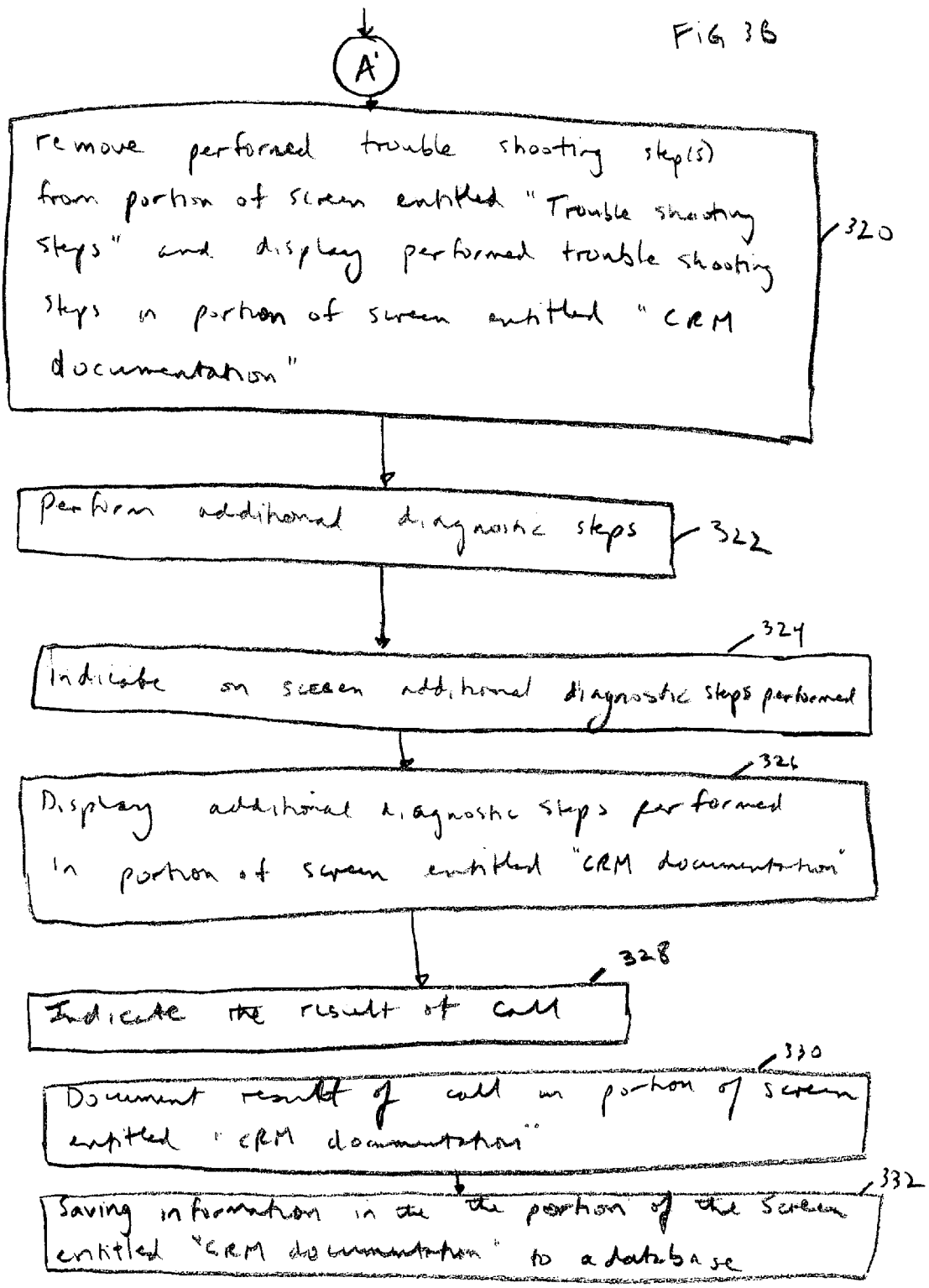

| Operating Systems | Modem Name | Modem Type | Issue | Error | Corresponding troubleshooting steps / Information required from customer |
|---|---|---|---|---|---|
| Any | Speedstream | 5100B | Can't Connect with Synch | Modem GUI not accessed - Page cannot be displayed | Ran Connectivity Assistant |
| Any | Speedstream | 5100B | Can't Connect with Synch | Modem GUI not accessed - Page cannot be displayed | Viewed Phone page |
| Any | Speedstream | 5100B | Can't Connect with Synch | Modem GUI not accessed - Page cannot be displayed | Check Router, Hub if any |
| Any | Speedstream | 5100B | Can't Connect with Synch | Modem GUI not accessed - Page cannot be displayed | Deleted cookies, Temp internet files, Lowered security settings, Advanced--accept first and third party cookies, Checked Never dial a connection, Deleted the earlier dial up connection, No LAN and proxy settings detected, Restore defaults |
| Any | Speedstream | 5100B | Can't Connect with Synch | Modem GUI not accessed - Page cannot be displayed | NIC = Enabled / Disabled |
| Any | Speedstream | 5100B | Can't Connect with Synch | Modem GUI not accessed - Page cannot be displayed | Try to pull gui |
| Any | Speedstream | 5100B | Can't Connect with Synch | Modem GUI not accessed - Page cannot be displayed | Did IPconfig /all ... |
| Any | Speedstream | 5100B | Can't Connect with Synch | Modem GUI not accessed - Page cannot be displayed | DHCP Address |
| Any | Speedstream | 5100B | Can't Connect with Synch | Modem GUI not accessed - Page cannot be displayed | IP address- |
| Any | Speedstream | 5100B | Can't Connect with Synch | Modem GUI not accessed - Page cannot be displayed | Subnet mask- |
| Any | Speedstream | 5100B | Can't Connect with Synch | Modem GUI not accessed - Page cannot be displayed | Default gateway |
| Any | Speedstream | 5100B | Can't Connect with Synch | Modem GUI not accessed - Page cannot be displayed | Did IPconfig /release...IPconfig /renew |
| Any | Speedstream | 5100B | Can't Connect with Synch | Modem GUI not accessed - Page cannot be displayed | System Resource - % free |
| Any | Speedstream | 5100B | Can't Connect with Synch | Modem GUI not accessed - Page cannot be displayed | Reset the modem |
| Any | Speedstream | 5100B | Can't Connect with Synch | Modem GUI not accessed - Page cannot be displayed | Verified Version of IE,Cipher strength= |
| Any | Speedstream | 5100B | Can't Connect with Synch | Modem GUI not accessed - Page cannot be displayed | Uninstalled and Reinstalled the SBC s/w,error msg= |
| Any | Speedstream | 5100B | Can't Connect with Synch | Modem GUI not accessed - Page cannot be displayed | Recommended to disable the firewall, antivirus, popup blockers. |
| Any | Speedstream | 5100B | Can't Connect with Synch | Modem GUI not accessed - Page cannot be displayed | Escalating to STS as per Article 5931 |
| Any | SpeedStream | 5100b | Phone Page | Line 11 - Connection = Down | End to End ATM ping = |

Figure 9 A

| | | | | |
|---|---|---|---|---|
| Any | SpeedStream | 5100b | Phone Page | Line 11 - Connection = Down | Account Status = Registered / Not registered |
| Any | SpeedStream | 5100b | Phone Page | Line 11 - Connection = Down | Ran Connectivity Assistant |
| Any | SpeedStream | 5100b | Phone Page | Line 11 - Connection = Down | Checked for Cables and Filters |
| Any | SpeedStream | 5100b | Phone Page | Line 11 - Connection = Down | Power cycled the Modem |
| Any | SpeedStream | 5100b | Phone Page | Line 11 - Connection = Down | Viewd the Phone Page |
| Any | SpeedStream | 5100b | Phone Page | Line 17 - Network Adapter Present = Fail | NIC = "Enabled /Disabled " |
| Any | SpeedStream | 5100b | Phone Page | Line 17 - Network Adapter Present = Fail | No Conflicts with the NIC - According to Call flow escalating to STS |
| Any | SpeedStream | 5100b | Phone Page | Line 17 - Network Adapter Present = Fail | Issue with the NIC - Supplied by SBC - Hence Transfered to CSI |
| Any | SpeedStream | 5100b | Phone Page | Line 17 - Network Adapter Present = Fail | Issue with the NIC - NOT Supplied by SBC - Hence Referred to OEM |
| Any | SpeedStream | 5100b | Phone Page | Line 12 - Ethernet Status = Cannot communicate with modem - Article No : 5928 | NIC = "Enabled/Disabled" |
| Any | SpeedStream | 5100b | Phone Page | Line 12 - Ethernet Status = Cannot communicate with modem - Article No : 5928 | Refreshed / Updated NIC Drivers |
| Any | SpeedStream | 5100b | Phone Page | Line 12 - Ethernet Status = Cannot communicate with modem - Article No : 5928 | Issue with the NIC - Supplied by SBC - Hence Transfered to CSI |
| Any | SpeedStream | 5100b | Phone Page | Line 12 - Ethernet Status = Cannot communicate with modem - Article No : 5928 | Issue with the NIC - NOT Supplied by SBC - Hence Referred to OEM |
| Any | SpeedStream | 5100b | Phone Page | Line 13 - PPPoE Session = Down - Article NO : 5928 | Ran Connectivity Assistant |
| Any | SpeedStream | 5100b | Phone Page | Line 13 - PPPoE Session = Down - Article NO : 5928 | ICE - MPS results and End to End ping |
| Any | SpeedStream | 5100b | Phone Page | Line 13 - PPPoE Session = Down - Article NO : 5928 | BBT = |
| Any | SpeedStream | 5100b | Phone Page | Line 13 - PPPoE Session = Down - Article NO : 5928 | Ran SST Utilities |
| Any | SpeedStream | 5100b | Phone Page | Line 13 - PPPoE Session = Down - Article NO : 5928 | Account = Activated/Deactivated |
| Any | SpeedStream | 5100b | Phone Page | Line 13 - PPPoE Session = Down - Article NO : 5928 | Reset password on the primary account |
| Any | SpeedStream | 5100b | Phone Page | Line 13 - PPPoE Session = Down - Article NO : 5928 | Pulled the GUI and updated the new password |
| Any | SpeedStream | 5100b | Phone Page | Line 13 - PPPoE Session = Down - Article NO : 5928 | Ran manage my email - SST |
| Any | SpeedStream | 5100b | Phone Page | Line 13 - PPPoE Session = Down - Article NO : 5928 | Still PPPoe Session = Down |

Figure 9 B

| | | | | |
|---|---|---|---|---|
| Win XP | Any | all modems except 5100b and routers like Netopia-Cayman,Cayman,spe edstream 5861, 2 Wire | Can't Connect with Synch | Error 678 | Ran Connectivity Assistant |
| Win XP | Any | all modems except 5100b and routers like Netopia-Cayman,Cayman,spe edstream 5861, 2 Wire | Can't Connect with Synch | Error 678 | Viewed Phone page |
| Win XP | Any | all modems except 5100b and routers like Netopia-Cayman,Cayman,spe edstream 5861, 2 Wire | Can't Connect with Synch | Error 678 | Check Router, Hub if any |
| Win XP | Any | all modems except 5100b and routers like Netopia-Cayman,Cayman,spe edstream 5861, 2 Wire | Can't Connect with Synch | Error 678 | ATM Ping/ICE results = |
| Win XP | Any | all modems except 5100b and routers like Netopia-Cayman,Cayman,spe edstream 5861, 2 Wire | Can't Connect with Synch | Error 678 | BBT= (subject to ASI/STS escalation) |
| Win XP | Any | all modems except 5100b and routers like Netopia-Cayman,Cayman,spe edstream 5861, 2 Wire | Can't Connect with Synch | Error 678 | Checked TCP/IP property |
| Win XP | Any | all modems except 5100b and routers like Netopia-Cayman,Cayman,spe edstream 5861, 2 Wire | Can't Connect with Synch | Error 678 | Check for Enet Light / 10base T Light |

Figure 9

| | | | |
|---|---|---|---|
| Win XP | Any | all modems except 5100b and routers like Netopia-Cayman,Cayman,spe edstream 5861, 2 Wire | Can't Connect with Synch | Error 678 | Check for Light at the back of the cpu |
| Win XP | Any | all modems except 5100b and routers like Netopia-Cayman,Cayman,spe edstream 5861, 2 Wire | Can't Connect with Synch | Error 678 | Checked for Network Adapters= |
| Win XP | Any | all modems except 5100b and routers like Netopia-Cayman,Cayman,spe edstream 5861, 2 Wire | Can't Connect with Synch | Error 678 | Deleted the existing connection |
| Win XP | Any | all modems except 5100b and routers like Netopia-Cayman,Cayman,spe edstream 5861, 2 Wire | Can't Connect with Synch | Error 678 | Power cycled the pc and the modem. |
| Win XP | Any | all modems except 5100b and routers like Netopia-Cayman,Cayman,spe edstream 5861, 2 Wire | Can't Connect with Synch | Error 678 | created a new connection |
| Win XP | Any | all modems except 5100b and routers like Netopia-Cayman,Cayman,spe edstream 5861, 2 Wire | Can't Connect with Synch | Error 678 | Customer still not able to connect |
| Win XP | Any | all modems except 5100b and routers like Netopia-Cayman,Cayman,spe edstream 5861, 2 Wire | Can't Connect with Synch | Error 678 | Ran IP config,I.P add: |

Figure 9

| Win XP | Any | all modems except 5100b and routers like Netopia-Cayman,Cayman,spe edstream 5861, 2 Wire | Can't Connect with Synch | Error 678 | Followed can't connect with sync call flow and escalating to STS |
| --- | --- | --- | --- | --- | --- |
| Win XP | Any | all modems except 5100b and routers like Netopia-Cayman,Cayman,spe edstream 5861, 2 Wire | Can't Connect with Synch | Error 676/633/734 | Ran Connectivity Assistant |
| Win XP | Any | all modems except 5100b and routers like Netopia-Cayman,Cayman,spe edstream 5861, 2 Wire | Can't Connect with Synch | Error 676/633/734 | Viewed Phone page |
| Win XP | Any | all modems except 5100b and routers like Netopia-Cayman,Cayman,spe edstream 5861, 2 Wire | Can't Connect with Synch | Error 676/633/734 | ATM Ping results = |
| Win XP | Any | all modems except 5100b and routers like Netopia-Cayman,Cayman,spe edstream 5861, 2 Wire | Can't Connect with Synch | Error 676/633/734 | BBT = |
| Win XP | Any | all modems except 5100b and routers like Netopia-Cayman,Cayman,spe edstream 5861, 2 Wire | Can't Connect with Synch | Error 676/633/734 | Check for Enet Light / 10base T Light |
| Win XP | Any | all modems except 5100b and routers like Netopia-Cayman,Cayman,spe edstream 5861, 2 Wire | Can't Connect with Synch | Error 676/633/734 | Checked Network adapters=Enabled |

Figure 9 

| Win XP | Any | all modems except 5100b and routers like Netopia-Cayman,Cayman,spe edstream 5861, 2 Wire | Can't Connect with Synch | Error 676/633/734 | Disabled dialup adapters if any |
| --- | --- | --- | --- | --- | --- |
| Win XP | Any | all modems except 5100b and routers like Netopia-Cayman,Cayman,spe edstream 5861, 2 Wire | Can't Connect with Synch | Error 676/633/734 | Deleted dial up connections if any |
| Win XP | Any | all modems except 5100b and routers like Netopia-Cayman,Cayman,spe edstream 5861, 2 Wire | Can't Connect with Synch | Error 676/633/734 | Checked Never dial a connection in Internet Explorer |
| Win XP | Any | all modems except 5100b and routers like Netopia-Cayman,Cayman,spe edstream 5861, 2 Wire | Can't Connect with Synch | Error 676/633/734 | Checked for LAN and Proxy settings |
| Win XP | Any | all modems except 5100b and routers like Netopia-Cayman,Cayman,spe edstream 5861, 2 Wire | Can't Connect with Synch | Error 676/633/734 | Uninstalled Dial Connection Manager if any |
| Win XP | Any | all modems except 5100b and routers like Netopia-Cayman,Cayman,spe edstream 5861, 2 Wire | Can't Connect with Synch | Error 676/633/734 | Checked TCP/IP property |
| Win XP | Any | all modems except 5100b and routers like Netopia-Cayman,Cayman,spe edstream 5861, 2 Wire | Can't Connect with Synch | Error 676/633/734 | Deleted PPPOE connection |

Figure 9

| | | | |
|---|---|---|---|
| Win XP | Any | all modems except 5100b and routers like Netopia-Cayman,Cayman,spe edstream 5861, 2 Wire | Can't Connect with Synch | Error 676/633/734 | Power cycled the modem & Checked if the cables and filters |
| Win XP | Any | all modems except 5100b and routers like Netopia-Cayman,Cayman,spe edstream 5861, 2 Wire | Can't Connect with Synch | Error 676/633/734 | created a PPPoE connection |
| Win XP | Any | all modems except 5100b and routers like Netopia-Cayman,Cayman,spe edstream 5861, 2 Wire | Can't Connect with Synch | Error 676/633/734 | unable to connect |
| Win XP | Any | all modems except 5100b and routers like Netopia-Cayman,Cayman,spe edstream 5861, 2 Wire | Can't Connect with Synch | Error 676/633/734 | Ran IP config,I.P add: |
| Win XP | Any | all modems except 5100b and routers like Netopia-Cayman,Cayman,spe edstream 5861, 2 Wire | Can't Connect with Synch | Error 676/633/734 | Followed Cant connect with sync call flow and escalating to STS |
| Win 98 | Any | all modems except 5100b and routers like Netopia-Cayman,Cayman,spe edstream 5861, 2 Wire | Can't Connect with Synch | E0040P | |
| Win 2000 | Any | all modems except 5100b and routers like Netopia-Cayman,Cayman,spe edstream 5861, 2 Wire | Can't Connect with Synch | E0040P | Ran Connectivity Assistant |

Figure 9

| | | | | |
|---|---|---|---|---|
| Win ME | Any | all modems except 5100b and routers like Netopia-Cayman,Cayman,speedstream 5861, 2 Wire | Can't Connect with Synch | E0040P | Viewed Phone page |
| Win ME | Any | all modems except 5100b and routers like Netopia-Cayman,Cayman,speedstream 5861, 2 Wire | Can't Connect with Synch | E0040P | BBT = |
| Win ME | Any | all modems except 5100b and routers like Netopia-Cayman,Cayman,speedstream 5861, 2 Wire | Can't Connect with Synch | E0040P | ATM Ping results = |
| Win ME | Any | all modems except 5100b and routers like Netopia-Cayman,Cayman,speedstream 5861, 2 Wire | Can't Connect with Synch | E0040P | Checked for PPPOE ethernet adapter |
| Win ME | Any | all modems except 5100b and routers like Netopia-Cayman,Cayman,speedstream 5861, 2 Wire | Can't Connect with Synch | E0040P | Checked if the adapter is enabled in Device manager |
| Win ME | Any | all modems except 5100b and routers like Netopia-Cayman,Cayman,speedstream 5861, 2 Wire | Can't Connect with Synch | E0040P | Checked TCP/IP property |
| Win ME | Any | all modems except 5100b and routers like Netopia-Cayman,Cayman,speedstream 5861, 2 Wire | Can't Connect with Synch | E0040P | Check for Enet Light / 10base T Light |

Figure 9 

| | | | |
|---|---|---|---|
| Win ME | Any | all modems except 5100b and routers like Netopia-Cayman,Cayman,spe edstream 5861, 2 Wire | Can't Connect with Synch | E0040P | Uninstalled Enternet 300 |
| Win ME | Any | all modems except 5100b and routers like Netopia-Cayman,Cayman,spe edstream 5861, 2 Wire | Can't Connect with Synch | E0040P | Power cycled the modem & Checked if the cables and filters |
| Win ME | Any | all modems except 5100b and routers like Netopia-Cayman,Cayman,spe edstream 5861, 2 Wire | Can't Connect with Synch | E0040P | Reinstalled Enternet 300 |
| Win ME | Any | all modems except 5100b and routers like Netopia-Cayman,Cayman,spe edstream 5861, 2 Wire | Can't Connect with Synch | E0040P | Created an Enternet profile – Tried connecting, Still E0040p |
| Win ME | Any | all modems except 5100b and routers like Netopia-Cayman,Cayman,spe edstream 5861, 2 Wire | Can't Connect with Synch | E0040P | Ran IP config,I.P add: |
| Win ME | Any | all modems except 5100b and routers like Netopia-Cayman,Cayman,spe edstream 5861, 2 Wire | Can't Connect with Synch | E0040P | Recommended to disable the firewall, antivirus, popup blockers. |
| Win ME | Any | all modems except 5100b and routers like Netopia-Cayman,Cayman,spe edstream 5861, 2 Wire | Can't Connect with Synch | E0040P | Followed Cant connect with sync call flow and escalating to STS |

Figure 9

| | | | | |
|---|---|---|---|---|
| WinXP | Any | all modems except 5100b and routers like Netopia-Cayman,Cayman,spe edstream 5861, 2 Wire | Can't Connect with Synch | Error 769 | Ran Connectivity Assistant |
| WinXP | Any | all modems except 5100b and routers like Netopia-Cayman,Cayman,spe edstream 5861, 2 Wire | Can't Connect with Synch | Error 769 | Viewed Phone page |
| WinXP | Any | all modems except 5100b and routers like Netopia-Cayman,Cayman,spe edstream 5861, 2 Wire | Can't Connect with Synch | Error 769 | Check for Enet Light / 10base T Light |
| WinXP | Any | all modems except 5100b and routers like Netopia-Cayman,Cayman,spe edstream 5861, 2 Wire | Can't Connect with Synch | Error 769 | Light at the back of the cpu is solid green.. |
| WinXP | Any | all modems except 5100b and routers like Netopia-Cayman,Cayman,spe edstream 5861, 2 Wire | Can't Connect with Synch | Error 769 | Check for the make of adapter |
| WinXP | Any | all modems except 5100b and routers like Netopia-Cayman,Cayman,spe edstream 5861, 2 Wire | Can't Connect with Synch | Error 769 | Checked for Network Adapters-Enabled/Disabled |
| WinXP | Any | all modems except 5100b and routers like Netopia-Cayman,Cayman,spe edstream 5861, 2 Wire | Can't Connect with Synch | Error 769 | Checked if there is any ?/! Marks on adapter |

Figure 9

| | | | | |
|---|---|---|---|---|
| WinXP | Any | all modems except 5100b and routers like Netopia-Cayman,Cayman,spe edstream 5861, 2 Wire | Can't Connect with Synch | Error 769 | Power cycled the modem & Checked if the cables and filters |
| WinXP | Any | all modems except 5100b and routers like Netopia-Cayman,Cayman,spe edstream 5861, 2 Wire | Can't Connect with Synch | Error 769 | Swapped the ethernet cables |
| WinXP | Any | all modems except 5100b and routers like Netopia-Cayman,Cayman,spe edstream 5861, 2 Wire | Can't Connect with Synch | Error 769 | Unable to connect (SBC Provided NIC - Error 769,) Transfered to CSI |
| WinXP | Any | all modems except 5100b and routers like Netopia-Cayman,Cayman,spe edstream 5861, 2 Wire | Can't Connect with Synch | Error 769 | Refer to OEM if a 3rd party NIC |
| Win 98 | Any | all modems except 5100b and routers like Netopia-Cayman,Cayman,spe edstream 5861, 2 Wire | Can't Connect with Synch | Error- E0041P | |
| Win 2000 | Any | all modems except 5100b and routers like Netopia-Cayman,Cayman,spe edstream 5861, 2 Wire | Can't Connect with Synch | Error- E0041P | Ran Connectivity Assistant |
| Win ME | Any | all modems except 5100b and routers like Netopia-Cayman,Cayman,spe edstream 5861, 2 Wire | Can't Connect with Synch | Error- E0041P | Viewed Phone page |

Figure 9

| | | | | |
|---|---|---|---|---|
| Win ME | Any | all modems except 5100b and routers like Netopia-Cayman,Cayman,spe edstream 5861, 2 Wire | Can't Connect with Synch | Error- E0041P | Checked for the working NIC = "Enabled " |
| Win ME | Any | all modems except 5100b and routers like Netopia-Cayman,Cayman,spe edstream 5861, 2 Wire | Can't Connect with Synch | Error- E0041P | Checked for the presence of Efficient networks pppoe adapter - no adapter found |
| Win ME | Any | all modems except 5100b and routers like Netopia-Cayman,Cayman,spe edstream 5861, 2 Wire | Can't Connect with Synch | Error- E0041P | Manually added the efficient networks pppoe adapter |
| Win ME | Any | all modems except 5100b and routers like Netopia-Cayman,Cayman,spe edstream 5861, 2 Wire | Can't Connect with Synch | Error- E0041P | Tried connecting with the enternet profile - Error E0041p |
| Win ME | Any | all modems except 5100b and routers like Netopia-Cayman,Cayman,spe edstream 5861, 2 Wire | Can't Connect with Synch | Error- E0041P | Uninstalled enternet 300 software |
| Win ME | Any | all modems except 5100b and routers like Netopia-Cayman,Cayman,spe edstream 5861, 2 Wire | Can't Connect with Synch | Error- E0041P | Powercycled modem/pc |
| Win ME | Any | all modems except 5100b and routers like Netopia-Cayman,Cayman,spe edstream 5861, 2 Wire | Can't Connect with Synch | Error- E0041P | reinstalled enternet 300 software |

Figure 9

| | | | |
|---|---|---|---|
| Win ME | Any | all modems except 5100b and routers like Netopia-Cayman,Cayman,spe edstream 5861, 2 Wire | Can't Connect with Synch | Error- E0041P | Checked n/w adapter for any red"X", "?"and "!" Marks if any=not found |
| Win ME | Any | all modems except 5100b and routers like Netopia-Cayman,Cayman,spe edstream 5861, 2 Wire | Can't Connect with Synch | Error- E0041P | Light at the back of the cpu is solid green.. |
| Win ME | Any | all modems except 5100b and routers like Netopia-Cayman,Cayman,spe edstream 5861, 2 Wire | Can't Connect with Synch | Error- E0041P | Created an Enternet profile – Tried connecting, Still E0041p |
| Win ME | Any | all modems except 5100b and routers like Netopia-Cayman,Cayman,spe edstream 5861, 2 Wire | Can't Connect with Synch | Error- E0041P | Escalating to STS |
| Win 98 | Any | all modems except 5100b and routers like Netopia-Cayman,Cayman,spe edstream 5861, 2 Wire | Can't Connect with Synch | Error- E0051P | Changed filter driver to protocol driver of Enternet 300 |
| Win 2000 | Any | all modems except 5100b and routers like Netopia-Cayman,Cayman,spe edstream 5861, 2 Wire | Can't Connect with Synch | Error- E0051P | Created a new enternet 300 profile |
| Win ME | Any | all modems except 5100b and routers like Netopia-Cayman,Cayman,spe edstream 5861, 2 Wire | Can't Connect with Synch | Error- E0051P | Tried connected with the profile - still same error |

Figure 9 

| | | | | |
|---|---|---|---|---|
| Win ME | Any | all modems except 5100b and routers like Netopia-Cayman,Cayman,spe edstream 5861, 2 Wire | Can't Connect with Synch | Error- E0051P | Uninstalled enternet 300 software |
| Win ME | Any | all modems except 5100b and routers like Netopia-Cayman,Cayman,spe edstream 5861, 2 Wire | Can't Connect with Synch | Error- E0051P | Powercycled modem/pc |
| Win ME | Any | all modems except 5100b and routers like Netopia-Cayman,Cayman,spe edstream 5861, 2 Wire | Can't Connect with Synch | Error- E0051P | reinstalled enternet 300 software |
| Win ME | Any | all modems except 5100b and routers like Netopia-Cayman,Cayman,spe edstream 5861, 2 Wire | Can't Connect with Synch | Error- E0051P | Created an Enternet profile – Tried connecting, Still E0051p |
| Win ME | Any | all modems except 5100b and routers like Netopia-Cayman,Cayman,spe edstream 5861, 2 Wire | Can't Connect with Synch | Error- E0051P | Escalated to STS |
| Win 98 | Any | all modems except 5100b and routers like Netopia-Cayman,Cayman,spe edstream 5861, 2 Wire | Can't Connect with Synch | Error-E0083P | Uninstalled enternet 300 software |
| Win 2000 | Any | all modems except 5100b and routers like Netopia-Cayman,Cayman,spe edstream 5861, 2 Wire | Can't Connect with Synch | Error-E0083P | Powercycled modem/pc |

Figure 9

| | | | | |
|---|---|---|---|---|
| Win ME | Any | all modems except 5100b and routers like Netopia-Cayman,Cayman,spe edstream 5861, 2 Wire | Can't Connect with Synch | Error-E0083P | reinstalled enternet 300 software |
| Win ME | Any | all modems except 5100b and routers like Netopia-Cayman,Cayman,spe edstream 5861, 2 Wire | Can't Connect with Synch | Error-E0083P | Created an Enternet profile – Tried connecting, Still E0051p |
| Win ME | Any | all modems except 5100b and routers like Netopia-Cayman,Cayman,spe edstream 5861, 2 Wire | Can't Connect with Synch | Error-E0083P | Escalated to STS as per Error Codes |
| Win 98 | Any | all modems except 5100b and routers like Netopia-Cayman,Cayman,spe edstream 5861, 2 Wire | Can't Connect with Synch | Page cannot be displayed - no ENET light on the modem | Ran Connectivity Assistant |
| Win 2000 | Any | all modems except 5100b and routers like Netopia-Cayman,Cayman,spe edstream 5861, 2 Wire | Can't Connect with Synch | Page cannot be displayed - no ENET light on the modem | Viewed Phone page |
| Win ME | Any | all modems except 5100b and routers like Netopia-Cayman,Cayman,spe edstream 5861, 2 Wire | Can't Connect with Synch | Page cannot be displayed - no ENET light on the modem | Check for Enet Light / 10base T Light |
| Win ME | Any | all modems except 5100b and routers like Netopia-Cayman,Cayman,spe edstream 5861, 2 Wire | Can't Connect with Synch | Page cannot be displayed - no ENET light on the modem | Light at the back of the cpu is solid green.. |

Figure 9

| OS | Connection | Modem/Router | Status | Symptom | Action |
|---|---|---|---|---|---|
| Win ME | Any | all modems except 5100b and routers like Netopia-Cayman,Cayman,spe edstream 5861, 2 Wire | Can't Connect with Synch | Page cannot be displayed - no ENET light on the modem | Check for the make of adapter |
| Win ME | Any | all modems except 5100b and routers like Netopia-Cayman,Cayman,spe edstream 5861, 2 Wire | Can't Connect with Synch | Page cannot be displayed - no ENET light on the modem | Checked for Network Adapters-Enabled/Disabled |
| Win ME | Any | all modems except 5100b and routers like Netopia-Cayman,Cayman,spe edstream 5861, 2 Wire | Can't Connect with Synch | Page cannot be displayed - no ENET light on the modem | Checked if there is any ?/! Marks on adapter |
| Win ME | Any | all modems except 5100b and routers like Netopia-Cayman,Cayman,spe edstream 5861, 2 Wire | Can't Connect with Synch | Page cannot be displayed - no ENET light on the modem | Power cycled the modem & Checked if the cables and filters |
| Win ME | Any | all modems except 5100b and routers like Netopia-Cayman,Cayman,spe edstream 5861, 2 Wire | Can't Connect with Synch | Page cannot be displayed - no ENET light on the modem | Swapped the ethernet cables |
| Win ME | Any | all modems except 5100b and routers like Netopia-Cayman,Cayman,spe edstream 5861, 2 Wire | Can't Connect with Synch | Page cannot be displayed - no ENET light on the modem | Unable to connect (SBC Provided NIC - Error 769.) Transfered to CSI |
| Win ME | Any | all modems except 5100b and routers like Netopia-Cayman,Cayman,spe edstream 5861, 2 Wire | Can't Connect with Synch | Page cannot be displayed - no ENET light on the modem | Refer to OEM if a 3rd party NIC |
| Any | Any | Any | Can't Connect without Synch | No synch | Ran Connectivity Assistant |

Figure 9

| Any | Any | Any | Can't Connect without Synch | No synch | Viewed Phone page |
|---|---|---|---|---|---|
| Any | Any | Any | Can't Connect without Synch | No synch | BBT= |
| Any | Any | Any | Can't Connect without Synch | No synch | ICE |
| Any | Any | Any | Can't Connect without Synch | No synch | Checked all cables and filters working fine |
| Any | Any | Any | Can't Connect without Synch | No synch | Removed the filter and plugged the dsl line directly in the wall-jack |
| Any | Any | Any | Can't Connect without Synch | No synch | Checked for Network Adapters—working fine |
| Any | Any | Any | Can't Connect without Synch | No synch | No EMI detected |
| Any | Any | Any | Can't Connect without Synch | No synch | BBT= |
| Any | Any | Any | Can't Connect without Synch | No synch | ICE= |
| Any | Any | Any | Can't Connect without Synch | No synch | Dsl light= |
| Any | Any | Any | Can't Connect without Synch | No synch | Power cycled the PC and the Modem. |
| Any | Any | Any | Can't Connect without Synch | No synch | Still modem has no sync - Escalating to ASI |
| Any | Any | Any | Can't Connect without Synch | No synch | Escalated to ASI as per Call Flow No Synch |
| Any | Any | Any | Can't Connect without Synch | No synch | TT: |
| Any | Any | Any | Can't Connect without Synch | Intermittent Synch | Ran Connectivity Assistant |
| Any | Any | Any | Can't Connect without Synch | Intermittent Synch | Viewed Phone page |
| Any | Any | Any | Can't Connect without Synch | Intermittent Synch | Checked all cables and filters working fine |
| Any | Any | Any | Can't Connect without Synch | Intermittent Synch | Removed the filter and plugged the dsl line directly in the wall-jack |
| Any | Any | Any | Can't Connect without Synch | Intermittent Synch | No EMI detected |
| Any | Any | Any | Can't Connect without Synch | Intermittent Synch | BBT= |
| Any | Any | Any | Can't Connect without Synch | Intermittent Synch | ICE= |
| Any | Any | Any | Can't Connect without Synch | Intermittent Synch | Dsl light= |
| Any | Any | Any | Can't Connect without Synch | Intermittent Synch | Power cycled the PC and the Modem. |

Figure 9

| | | | Can't Connect without Synch | Intermittent Synch | Still modem has intermittent sync - Escalating to ASI |
|---|---|---|---|---|---|
| Any | Any | Any | Can't Connect without Synch | Intermittent Synch | Escalated to ASI as per Call Flow Intermittent Synch |
| Any | Any | Any | Can't Connect without Synch | Intermittent Synch | TT: |
| Any | Any | Any | Connected | No browse | Ran Connectivity Assistant |
| Any | Any | Any | Connected | No browse | Viewed Phone page |
| Any | Any | Any | Connected | No browse | Requested customer to isolate router if any |
| Any | Any | Any | Connected | No browse | Pinged yahoo.com-results:- |
| Any | Any | Any | Connected | No browse | pinged 66.218.71.198-results:- |
| Any | Any | Any | Connected | No browse | BBT |
| Any | Any | Any | Connected | No browse | ICETOOL/ATM ping= |
| Any | Any | Any | Connected | No browse | Deleted cookies, Temp internet files, Lowered security settings, Privacy-Accept fist and third party cookies, Always allow session cookies, Never Dial a connection is checked, No LAN and PROXY Settings Detected, Restore defaults settings on Internet Explorer |
| Any | Any | Any | Connected | No browse | Force DNS |
| Any | Any | Any | Connected | No browse | Power cycled the pc and the modem. |
| Any | Any | Any | Connected | No browse | Deleted and recreated the Connection.. |
| Any | Any | Any | Connected | No browse | customer still unable to browse. |
| Any | Any | Any | Connected | No browse | Checked system resources = |
| Any | Any | Any | Connected | No browse | Recommended to disable the firewalls, antivirus software and popup blockers |
| Any | Any | Any | Connected | No browse | Closed and reopened the browser |
| Any | Any | Any | Connected | No browse | Ran IP config,I.P add: |
| Any | Any | Any | Connected | No browse | Followed connection no browse and escalating to STS |
| Any | Any | Any | Connected | Slow Browse | Ran Connectivity Assistant |
| Any | Any | Any | Connected | Slow Browse | Viewed Phone page |
| Any | Any | Any | Connected | Slow Browse | Requested customer to isolate router if any |
| Any | Any | Any | Connected | Slow Browse | Pinged yahoo.com-results:- |
| Any | Any | Any | Connected | Slow Browse | pinged 66.218.71.198-results:- |
| Any | Any | Any | Connected | Slow Browse | Ran speed test ref no: |
| Any | Any | Any | Connected | Slow Browse | BBT= |
| Any | Any | Any | Connected | Slow Browse | ICETOOL/ATM ping= |
| Any | Any | Any | Connected | Slow Browse | Forced DNS. |
| Any | Any | Any | Connected | Slow Browse | Deleted cookies, Temp internet files, Lowered security settings, Privacy-Accept fist and third party cookies, Always allow session cookies, Never Dial a connection is checked, No LAN and PROXY Settings Detected, Restore defaults settings on Internet Explorer |
| Any | Any | Any | Connected | Slow Browse | Power cycled the PC and Modem. |

Figure 9

| | | | | | |
|---|---|---|---|---|---|
| Any | Any | Any | Connected | Slow Browse | Checked system resources= |
| Any | Any | Any | Connected | Slow Browse | Recommended to disable the firewalls, antivirus software and popup blockers |
| Any | Any | Any | Connected | Slow Browse | stomer able to connect, still facing slow browse problem |
| Any | Any | Any | Connected | Slow Browse | Escalated to ASI as per Call Flow Connection Slow Browse |
| Any | Netopia-Cayman | 3546 | Connected | Slow Browse | Ran Connectivity Assistant |
| Any | Netopia-Cayman | 3346 | Connected | Slow Browse | Ran Connectivity Assistant |
| Any | Netopia-Cayman | 3220H | Connected | Slow Browse | Viewed Phone page |
| Any | Speedstream | 5861 | Connected | Slow Browse | Asked customer to work on single computer and shutdown remaining computers |
| Any | 2 wire | 2 wire | Connected | Slow Browse | Requested customer to isolate router if any |
| Any | 2 wire | 2 wire | Connected | Slow Browse | Pinged yahoo.com-results:- |
| Any | 2 wire | 2 wire | Connected | Slow Browse | pinged 66.218.71.198-results:- |
| Any | 2 wire | 2 wire | Connected | Slow Browse | Ran speed test ,ref no: |
| Any | 2 wire | 2 wire | Connected | Slow Browse | BBT= |
| Any | 2 wire | 2 wire | Connected | Slow Browse | ICETOOL/ATM ping= |
| Any | 2 wire | 2 wire | Connected | Slow Browse | Forced DNS. |
| Any | 2 wire | 2 wire | Connected | Slow Browse | Deleted cookies, Temp internet files, Lowered security settings, Privacy-Accept fist and third party cookies, Always allow session cookies, Never Dial a connection is checked, No LAN and PROXY Settings Detected, Restore defaults settings on Internet Explorer |
| Any | 2 wire | 2 wire | Connected | Slow Browse | Power cycled the PC and Modem. |
| Any | 2 wire | 2 wire | Connected | Slow Browse | Checked system resources= |
| Any | 2 wire | 2 wire | Connected | Slow Browse | Recommended to disable the firewalls, antivirus software and popup blockers |
| Any | 2 wire | 2 wire | Connected | Slow Browse | customer able to connect ,still facing slow browse problems. |
| Any | 2 wire | 2 wire | Connected | Slow Browse | Escalated to ASI as per Call Flow Connection Slow Browse |
| Any | Any | Any | E-mail Can't Send/Receive | Outlook Express 5.0 | Ran SST E-mail Assistant |
| Any | Any | Any | E-mail Can't Send/Receive | Outlook Express 6.0 | Viewed Phone page |
| Any | Any | Any | E-mail Can't Send/Receive | Microsoft Outlook 98 | Checked if customer is connected |
| Any | Any | Any | E-mail Can't Send/Receive | Microsoft Outlook 2000 | Isolated router if any |
| Any | Any | Any | E-mail Can't Send/Receive | Microsoft Outlook 2002 | Checked if customer is Legacy/Migrated |
| Any | Any | Any | E-mail Can't Send/Receive | Microsoft Outlook 2002 | Checked settings of e-mail account |
| Any | Any | Any | E-mail Can't Send/Receive | Microsoft Outlook 2002 | Tried sending an e-mail to autoresponder. |
| Any | Any | Any | E-mail Can't Send/Receive | Microsoft Outlook 2002 | Unable to send/recv email |
| Any | Any | Any | E-mail Can't Send/Receive | Microsoft Outlook 2002 | Recommended to disable the firewalls, antivirus software and popup blockers |
| Any | Any | Any | E-mail Can't Send/Receive | Microsoft Outlook 2002 | Unable to send/recv email |
| Any | Any | Any | E-mail Can't Send/Receive | Microsoft Outlook 2002 | Ran IP config,I.P add: |
| Any | Any | Any | E-mail Can't Send/Receive | Microsoft Outlook 2002 | Escalated to STS as per Call Flow E-mail Can't Send/Recieve |

Figure 9

| Col1 | Modem | Code | Status | GUI | Notes |
|---|---|---|---|---|---|
| Any | Netopia-Cayman | 3546 | Can't Connect with Synch | Unable to pull up GUI | Ran ICE - Cant connect with sync module = end to end ATM ping = |
| Any | Netopia-Cayman | 3346 | Can't Connect with Synch | Unable to pull up GUI | Checked for network of computers |
| Any | Netopia-Cayman | 3220H | Can't Connect with Synch | Unable to pull up GUI | cold booted the computer and the router |
| Any | Speedstream | 5861 | Can't Connect with Synch | Unable to pull up GUI | Checked browsing by URL - No success |
| Any | Speedstream | 5861 | Can't Connect with Synch | Unable to pull up GUI | Checked browsing by IP address - No success |
| Any | Speedstream | 5861 | Can't Connect with Synch | Unable to pull up GUI | Tried to access the GUI by the default gateway - no success |
| Any | Speedstream | 5861 | Can't Connect with Synch | Unable to pull up GUI | Checked for never dial a connection |
| Any | Speedstream | 5861 | Can't Connect with Synch | Unable to pull up GUI | checked all the browser settings |
| Any | Speedstream | 5861 | Can't Connect with Synch | Unable to pull up GUI | Checked lan and proxy settings |
| Any | Speedstream | 5861 | Can't Connect with Synch | Unable to pull up GUI | checked for working NIC |
| Any | Speedstream | 5861 | Can't Connect with Synch | Unable to pull up GUI | Tried to pull the GUI - no success |
| Any | Speedstream | 5861 | Can't Connect with Synch | Unable to pull up GUI | Connected only one computer to the router |
| Any | Speedstream | 5861 | Can't Connect with Synch | Unable to pull up GUI | Ran ICE - Cant connect with sync module = end to end ATM ping = |
| Any | Speedstream | 5861 | Can't Connect with Synch | Unable to pull up GUI | Disabled internet connection sharing |
| Any | Speedstream | 5861 | Can't Connect with Synch | Unable to pull up GUI | Ran IP config,I.P add: |
| Any | Speedstream | 5861 | Can't Connect with Synch | Unable to pull up GUI | Still not able to pull the gui ... Followed AFSS article and escalating to STS |
| Any | Netopia-Cayman | 3546 | Can't Connect with Synch | Unable to connect | Ran ICE - Cant connect with sync module = end to end ATM ping = |
| Any | Netopia-Cayman | 3346 | Can't Connect with Synch | Unable to connect | Checked for network of computers |
| Any | Netopia-Cayman | 3220H | Can't Connect with Synch | Unable to connect | cold booted the computer and the router |
| Any | Speedstream | 5861 | Can't Connect with Synch | Unable to connect | Checked browsing by URL - No success |
| Any | Speedstream | 5861 | Can't Connect with Synch | Unable to connect | Checked browsing by IP address - No success |
| Any | Speedstream | 5861 | Can't Connect with Synch | Unable to connect | Tried to access the GUI by the default gateway - success |
| Any | Speedstream | 5861 | Can't Connect with Synch | Unable to connect | Logged into the gui |
| Any | Speedstream | 5861 | Can't Connect with Synch | Unable to connect | In quick start updated the right user id and the password |
| Any | Speedstream | 5861 | Can't Connect with Synch | Unable to connect | Submitted the changes and restarted netopia |
| Any | Speedstream | 5861 | Can't Connect with Synch | Unable to connect | Unable to connect |
| Any | Speedstream | 5861 | Can't Connect with Synch | Unable to connect | Ran Diagnostic Utility |
| Any | Speedstream | 5861 | Can't Connect with Synch | Unable to connect | Checked for netopia being configured for 1483 bridge mode |
| Any | Speedstream | 5861 | Can't Connect with Synch | Unable to connect | Did appropriate steps for failed test in diagnostics |
| Any | Speedstream | 5861 | Can't Connect with Synch | Unable to connect | Tried to browse url - page cannot be displayed |
| Any | Speedstream | 5861 | Can't Connect with Synch | Unable to connect | Forced DNS and cold booted the computer |
| Any | Speedstream | 5861 | Can't Connect with Synch | Unable to connect | Again checked for firewalls, filters and EMI sources |
| Any | Speedstream | 5861 | Can't Connect with Synch | Unable to connect | Ran IP config,I.P add: |
| Any | Speedstream | 5861 | Can't Connect with Synch | Unable to connect | Escalating to STS by following AFSS arctcle # 5153 |

Figure 9

| | | | | |
|---|---|---|---|---|
| Any | Any | all modems except 5100b and routers like Netopia-Cayman,Cayman,spe edstream 5861, 2 Wire | Authentication | Error 691/Invalid userid and password/E0037P | Email Id: |
| Any | Any | all modems except 5100b and routers like Netopia-Cayman,Cayman,spe edstream 5861, 2 Wire | Authentication | Error 691/Invalid userid and password/E0037P | Ran ICE - Cant connect with sync module = end to end ATM ping = |
| Any | Any | all modems except 5100b and routers like Netopia-Cayman,Cayman,spe edstream 5861, 2 Wire | Authentication | Error 691/Invalid userid and password/E0037P | BBT= |
| Any | Any | all modems except 5100b and routers like Netopia-Cayman,Cayman,spe edstream 5861, 2 Wire | Authentication | Error 691/Invalid userid and password/E0037P | Checked for a/c status in MPS = |
| Any | Any | all modems except 5100b and routers like Netopia-Cayman,Cayman,spe edstream 5861, 2 Wire | Authentication | Error 691/Invalid userid and password/E0037P | Checked for a/c status in Yahoo AMT= |
| Any | Any | all modems except 5100b and routers like Netopia-Cayman,Cayman,spe edstream 5861, 2 Wire | Authentication | Error 691/Invalid userid and password/E0037P | Authenticated the cust |
| Any | Any | all modems except 5100b and routers like Netopia-Cayman,Cayman,spe edstream 5861, 2 Wire | Authentication | Error 691/Invalid userid and password/E0037P | Reset the password |

Figure 9

| Any | Any | all modems except 5100b and routers like Netopia-Cayman,Cayman,spe edstream 5861, 2 Wire | Authentication | Error 691/Invalid userid and password/E0037P | Unable to login |
|---|---|---|---|---|---|
| Any | Any | all modems except 5100b and routers like Netopia-Cayman,Cayman,spe edstream 5861, 2 Wire | Authentication | Error 691/Invalid userid and password/E0037P | Deleted and created a new profile |
| Any | Any | all modems except 5100b and routers like Netopia-Cayman,Cayman,spe edstream 5861, 2 Wire | Authentication | Error 691/Invalid userid and password/E0037P | Unable to login |
| Any | Any | all modems except 5100b and routers like Netopia-Cayman,Cayman,spe edstream 5861, 2 Wire | Authentication | Error 691/Invalid userid and password/E0037P | Escalated to STS as per Can't Log onto Home page |
| Any | Any | 5100b and routers like Netopia-Cayman,Cayman,spe edstream 5861, 2 Wire | Authentication | Invalid userid/password | Email Id: |
| Any | Any | 5100b and routers like Netopia-Cayman,Cayman,spe edstream 5861, 2 Wire | Authentication | Invalid userid/password | Ran ICE - Cant connect with sync module = end to end ATM ping = |
| Any | Any | 5100b and routers like Netopia-Cayman,Cayman,spe edstream 5861, 2 Wire | Authentication | Invalid userid/password | BBT = |
| Any | Any | 5100b and routers like Netopia-Cayman,Cayman,spe edstream 5861, 2 Wire | Authentication | Invalid userid/password | Checked for a/c status in MPS = |

Figure 9

| Any | Any | 5100b and routers like Netopia-Cayman,Cayman,speedstream 5861, 2 Wire | Authentication | Invalid userid/password | Checked for a/c status in Yahoo AMT= |
|---|---|---|---|---|---|
| Any | Any | 5100b and routers like Netopia-Cayman,Cayman,speedstream 5861, 2 Wire | Authentication | Invalid userid/password | Authenticated the cust |
| Any | Any | 5100b and routers like Netopia-Cayman,Cayman,speedstream 5861, 2 Wire | Authentication | Invalid userid/password | Reset the password |
| Any | Any | 5100b and routers like Netopia-Cayman,Cayman,speedstream 5861, 2 Wire | Authentication | Invalid userid/password | Tried Logging in using userid and new password in GUI |
| Any | Any | 5100b and routers like Netopia-Cayman,Cayman,speedstream 5861, 2 Wire | Authentication | Invalid userid/password | Unable to login |
| Any | Any | 5100b and routers like Netopia-Cayman,Cayman,speedstream 5861, 2 Wire | Authentication | Invalid userid/password | Escalated to STS as per Can't Log onto Home page |

Figure 9

CALL CENTER SUPPORT AND DOCUMENTATION SYSTEM

REFERENCE TO RELATED APPLICATION

This application claims the benefit of U.S. Provisional Patent Application No. 60/678,268, filed May 5, 2005, the contents of which are incorporated by reference herein in its entirety.

BACKGROUND OF THE INVENTION

1. Technical Field

The invention relates to systems for processing calls to a call center. In particular, the invention relates to systems for processing and/or documenting incoming calls to the call center.

2. Related Art

Call centers are typically utilized to support a product or service for a business. The support may be in answering a customer's question or in receiving information from the customer. For example, call centers may be staffed by one or more agents to answer questions relating to the business' product or service, such as setup or operation of the product. As another example, call centers may receive information from customers or potential customers, such as warranty information, complaints, credit-card activation, or the like.

The call center may receive a request from the customer, either in the form of an incoming telephone call, an e-mail, or some other electronic message. The agents who staff the call center may respond to the request of the customer, such as by answering the telephone call, responding to the e-mail, or the like. Thus, the call center may include interacting with the customer via telephone, and may also include interacting with the customer via e-mail, or other electronic means.

In processing the request of the customer, the call center may have two goals: (1) responding to the request of the customer (such as answering the customer's questions and/or receiving information from the customer); and (2) documenting the call (such as documenting the question of the customer, the recommended solution provided the customer, etc.). The time it takes to process a call (such as respond to the customer's request and/or document the call) is called the handle time.

One example of a business that may request call center services is an Internet Service Provider (ISP) wherein Narrow band (Dial up) and/or broad band (Digital Subscriber Line) customers of the ISP may call the call center to troubleshoot connectivity or related issues faced by them and the call center may handle these calls. Typically, agents in the call center attempt to resolve the customer's issue with the help of backend knowledge bases that they have access to. Moreover, the agents may be required to document details of the customer contact, such as on a backend application of the client where customer information is stored. A call may last between 10-40 minutes. The average handle time (across all calls) may be approximately 20 minutes. This average handle time is merely an example, and may be longer or shorter.

It is not uncommon to have many agents, such as 1000 agents, handle a large number of calls every month, such as 300,000 calls every month. One may wish to reduce the handle time of calls, thereby reducing the average handle time. There are a variety of activities which may result in the length of handling of a call. One activity may be the time it takes for the agent to diagnose the problem and determine the necessary steps that need to be taken to resolve the problem. Another activity that may contribute to the length of time to handle a call is the agent's documenting details of the customer contact on the backend. While there is a knowledge base to support diagnosing and determining the problem, even toggling between windows is time intensive leading to longer handling of the call. Therefore, there is a need to reduce the length of handling a call in a call center.

SUMMARY

In one embodiment, a method and system for call support and documentation is provided to reduce the handle time for a call. The method and system provide an agent working at a call center with information on the screen to process the call (including inputting customer information, trouble shooting the call, and documenting the call) so that the agent may process the call more quickly. In one aspect, the method and system display information on the screen so that the agent need not toggle between windows in order to process the call. For example, the system and method present input form fields in a first portion of the screen for the agent to input data regarding the customer. The input data may include information identifying the customer and information identifying the customer's problem. Based on the data input, a background program may determine trouble shooting steps to diagnose and/or solve the customer's problem. Part or all of the trouble shooting steps may be displayed in a second portion of the screen. For example, the trouble shooting steps may be displayed in a list in the second portion of the screen, so that the agent may easily determine which steps to perform. Further, with the first and second portions of the screen simultaneously visible, the agent may process the call more quickly and without the need to toggle between different windows.

In another aspect of the invention, the method and system provide the agent with a third portion of the screen that documents the call. The background program may display in the third portion of the screen what data has been input and what actions have been performed on the call. Specifically, the background program may display in the third portion the data input, such as the customer information and the customer's problem. The background program may also display the steps taken to diagnose or solve the problem. For example, when the agent indicates that a specific trouble shooting step listed in the second portion of the screen has been performed, the background program may document in the third portion of the screen the specific trouble shooting step performed, and may also remove the specific trouble shooting step from the second portion of the screen. In this manner, the background program may automatically generate the documentation based on the actions of the agent, so that the documentation is more quickly and more uniformly generated and more uniformly generated. Further, the third portion of the screen, along with the first and second portions, may be simultaneously visible so that the agent can process the call without having to toggle between different windows.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 4 is an example of an initial display screen for a computer operating the Call Center Support and Documentation System as depicted in FIG. 2.

FIG. 6 is an example of a portion of the display screen highlighting the reason for call/error message for input by the agent of the Call Center and the trouble shooting steps.

FIG. 7 is an example of a portion of the display screen highlighting the agent executing one of the trouble shooting steps and the corresponding documentation populated in another part of the screen.

FIG. 8 is an example of a portion of the display screen highlighting the documentation section that may be used to document the interaction of the agent with the customer.

FIGS. 9A-W are an example of a table that may be used to generate the trouble shooting steps in the portion of the display screen of FIG. 6.

DETAILED DESCRIPTION OF THE PREFERRED EMBODIMENTS

By way of overview, the preferred embodiments described below relate to a Call Center Support and Documentation system and method. In a call center, the Call Center Support and Documentation system and method may be used to better support agents in processing call received to the call center (such as assisting the agent in diagnosing a problem that a customer may have or in obtaining information from the customer), and may be used to better document a call. In this manner, the system and method may reduce the handle time of a call, and may more quickly, efficiently, and/or uniformly document the call. Thus, the system and method may achieve any one, some, or all of the following: reduce documentation time following a customer contact; reduce time spent in toggling between multiple windows; increase consistency in the troubleshooting process (between agents and period of time); reduce time to train new agents of the Call Center; simplify the troubleshooting process; and standardize documentation across multiple agents.

Figure 1:
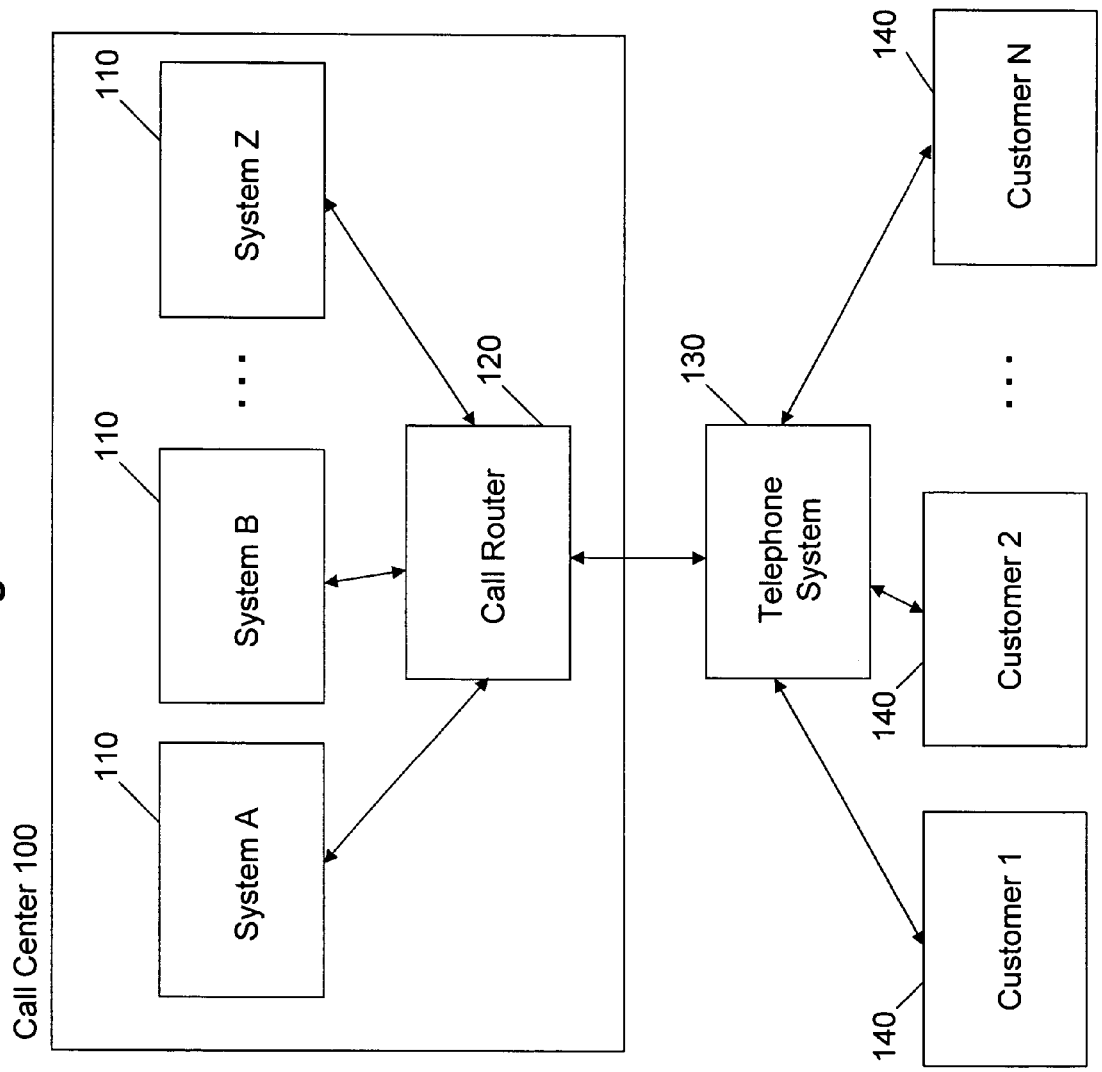
FIG. 1 is a block diagram of one example of a configuration of a call center including multiple Call Center Support and Documentation Systems used by agents.

Turning to the drawings, FIG. 1 shows a block diagram of one configuration of a call center 100. The call center 100 may include one or more Call Center Support and Documentation system 110. As shown in FIG. 1, the call center includes systems A-Z. One or more system 110 may be used. Each agent in the call center 100 may be assigned a system 110 in order to process and/or document a call. In order to route calls to the agents, the call center 100 may include a call router 120. The call router may route the calls to any one of the systems 110. Further, customers 140 may electronically communicate with the call center 100 in any one of several ways. For example, the customers 130 may telephone the call center 100 via a telephone system 130 (such as a wired, wireless, or wired and wireless telephone system), may send an e-mail to the call center, or may send a webcast request to the call center.

Figure 2:
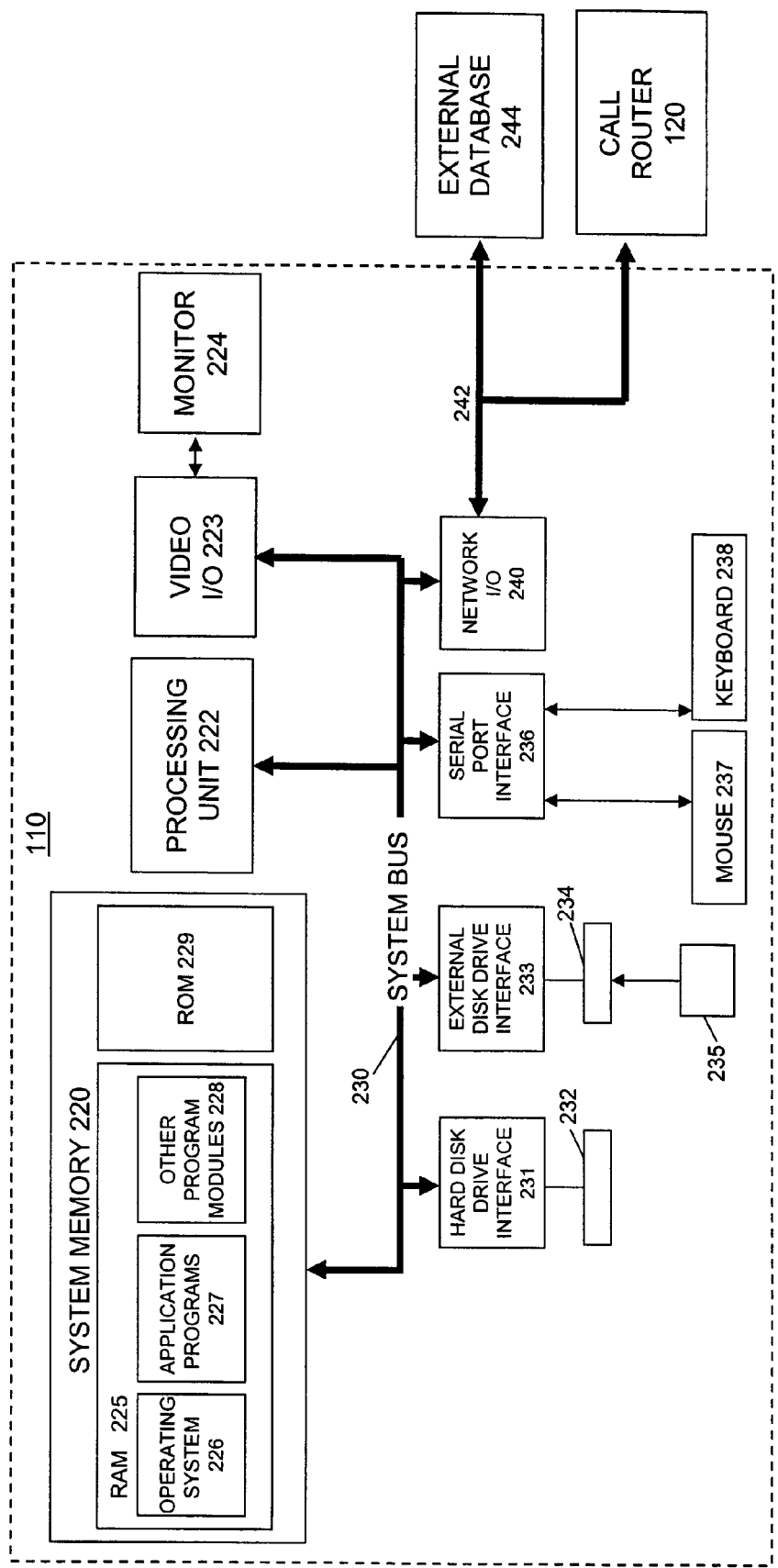
FIG. 2 is an expanded block diagram of the Call Center Support and Documentation System depicted in FIG. 1.

FIG. 2 is an expanded block diagram for the Call Center Support and Documentation system 110. The system 110 may comprise a general purpose computing device, including a processing unit 222, a system memory 220, and a system bus 230, that couples various system components including the system memory 220 to the processing unit 222. The processing unit 222 may perform arithmetic, logic and/or control operations by accessing system memory 220. The system memory 220 may store information and/or instructions for use in combination with processing unit 222. The system memory 220 may include volatile and non-volatile memory, such as random access memory (RAM) 225 and read only memory (ROM) 229. A basic input/output system (BIOS) containing the basic routines that helps to transfer information between elements within the computer device, such as during start-up, may be stored in ROM 229. The system bus 230 may be any of several types of bus structures including a memory bus or memory controller, a peripheral bus, and a local bus using any of a variety of bus architectures.

The system 110 may further include a hard disk drive 232 for reading from and writing to a hard disk (not shown), and an external disk drive 234 for reading from or writing to a removable external disk 235. The removable disk may be a magnetic disk for a magnetic disk driver or an optical disk such as a CD ROM for an optical disk drive. The hard disk drive 232 and external disk drive 235 may be connected to the system bus 230 by a hard disk drive interface 231 and an external disk drive interface 233, respectively. The drives and their associated computer-readable media provide nonvolatile storage of computer readable instructions, data structures, program modules and other data for the system 110. Although the exemplary environment described herein employs a hard disk and an external disk 235, it should be appreciated by those skilled in the art that other types of computer readable media which can store data that is accessible by a computer, such as magnetic cassettes, flash memory cards, random access memories, read only memories, and the like, may also be used in the exemplary operating environment.

Figure 4:
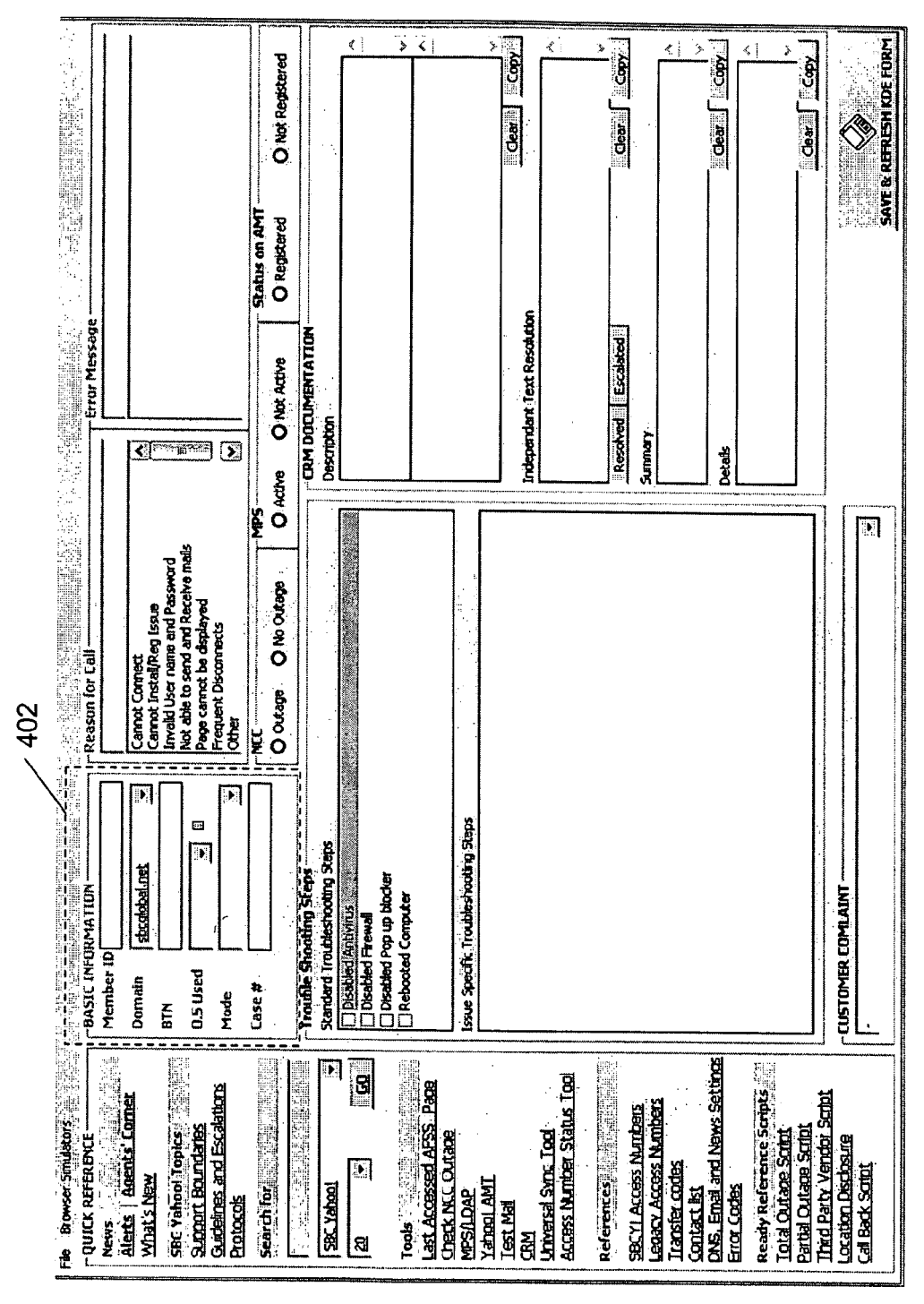

A number of program modules may be stored on the hard disk, external disk 235, ROM 229 or RAM 225, including one or more application programs 227, other program modules (not shown), an operating system 226, and program data (not shown). One such application program may comprise the functionality of presenting various portions of the graphical user interface, such as the "BASIC INFORMATION," "Trouble Shooting Steps," and "CRM Documentation" portions of the graphical user interface, as shown in FIG. 4. The software for presenting the portions of the graphical user interface may comprise Visual Basic 6.0. Other programs may also be used. Another application program may include the logic tree depicted in FIGS. 9A-W. In this manner, the logic tree may be resident within system 110. Alternatively, the logic tree depicted in FIGS. 9A-W may be resident in an external database 244, accessible by system 110 via a network I/O 240 through line 242. The external database may be part of a back end application, such as an SQL server with MS Access. In this manner, each of the systems 110 may access the logic tree resident in external database 244. The connection 242 between the system 110 and the external database 244 may include a local area network (LAN) or a wide area network (WAN). Such networking environments are commonplace in offices, enterprise-wide computer networks, intranets and the Internet. As shown in FIG. 2, the call router 120 may further communicate via the network I/O 240 in order to route a call to the system 110 for the agent to communicate with customer 130.

The agent may enter the input data, such as the data for the "BASIC INFORMATION" portion of the graphical user interface into the system 110 through input devices such as mouse 237 and keyboard 238. Other input devices (not shown) may include a microphone (or other sensors), joystick, game pad, scanner, or the like. These and other input devices may be connected to the processing unit 222 through a serial port interface 236 that is coupled to the system bus 230, or may be collected by other interfaces. A monitor 224, or other type of display device, may serve as the graphical user interface and may also be connected to the system bus 230 via an interface, such as a video input/output 223. In addition to the monitor 224, computing environment 210 may include other peripheral output devices (not shown), such as speakers or other audible output. Further, the external database 244 may be used to store documentation of the call, such as the CRM application, as discussed in more detail below.

Figure 3A:
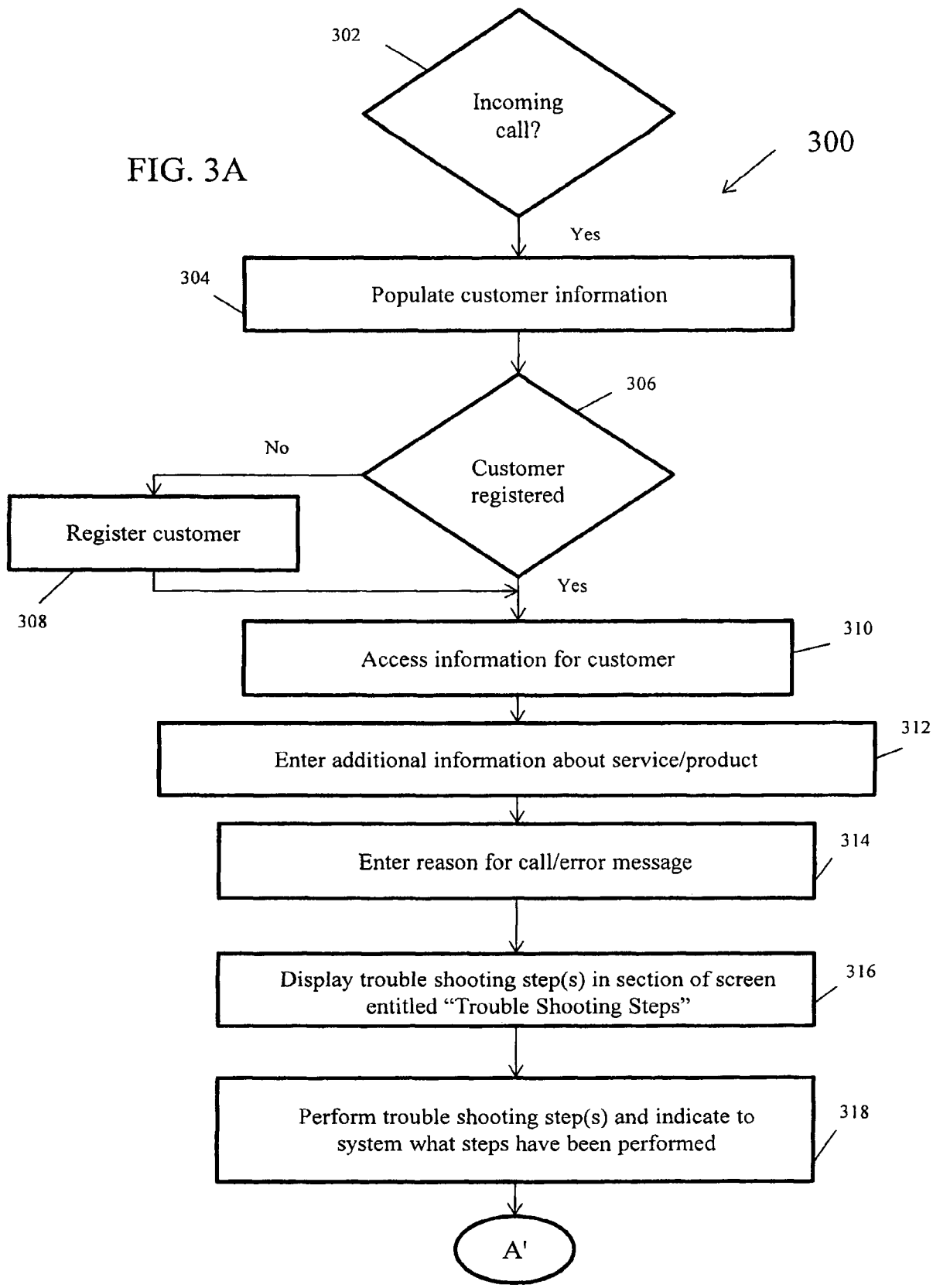
FIG. 3 is an example of a flow chart for processing an incoming call for the Call Center Support and Documentation System as depicted in FIG. 2.

Referring to FIGS. 3A-B, there is shown an example of a flow chart 300 for processing an incoming call for the Call Center Support and Documentation System as depicted in FIG. 2. As shown at block 302, it is determined whether an incoming call has been routed to system 110. If a call has been routed, information about the customer may be populated in a part of the display screen, as shown at block 304. FIG. 4 shows an example of a display without any information populated. The display includes various sections relating to the call, including sections relating to inputting data, to resolving the call, to documenting the call, and to providing assistance to the agent. For example, the display may include sections for inputting basic information for the customer (see, for example, "BASIC INFORMATION"); for inputting the reasons for the call (see, for example, "Reason for Call" and "Error Message); for resolving the reasons for the call (see, for example, "Trouble Shooting Steps", "Tools", etc.); and for providing background information to the agent (see, for example, "References"). With all of the information shown on the screen in FIG. 4, there is less of a need for the agent to toggle between various windows when processing the call.

Figure 5:
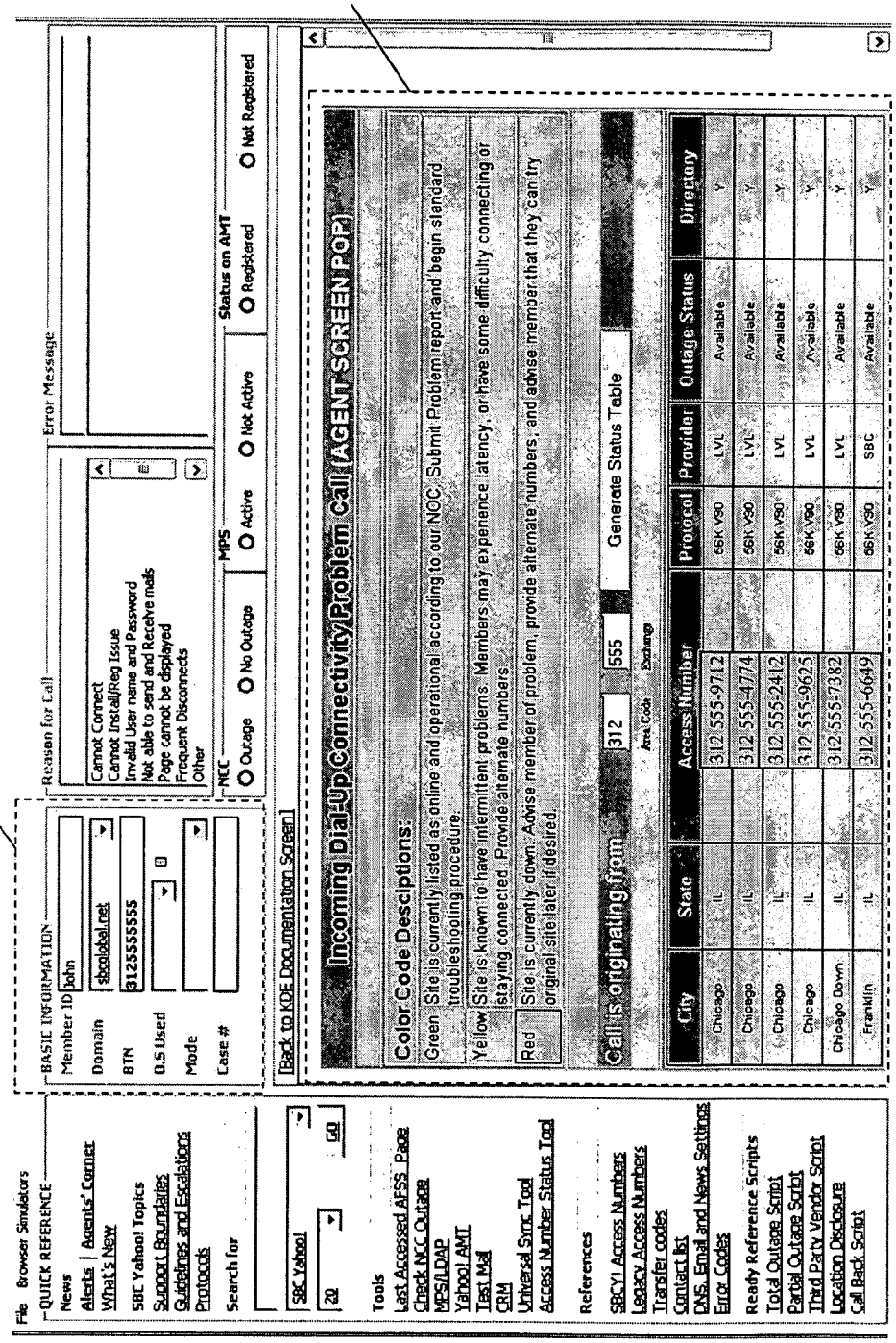
FIG. 5 is an example of a portion of the display screen highlighting the BASIC INFORMATION for input by the agent of the Call Center.

The population of the information on the screen may be manual, such as the agent entering the customer's name, address, or other identifier. Or, the population of the screen may be automatic, such as a DNS number automatically obtained from the caller. An example of the portion of the screen that may be populated by the agent is shown in FIG. 5, which shows at block 502 under the heading BASIC INFORMATION. Using the customer information, it may be determined whether the customer is registered, as shown at block 306 If the customer is not registered, the customer may then be registered, as shown at block 308. If the customer is registered, information associated with the customer may be accessed, as shown at block 310. The customer information may comprise a profile for the customer, such as including the customer's name, user ID, etc. After the customer information, such as the customer's profile is accessed, the customer information may be displayed on the screen. For example, the customer information may be displayed on a lower portion of the screen so that the agent may review the customer information if necessary, without having to toggle between windows.

In addition to customer identifier information, additional information regarding the service or product may be shown on the screen, as shown at block 312. In the example of call center for an Internet Service Provider, the additional information may be included in the BASIC INFORMATION, such as the domain name (as shown in FIG. 5, the domain name is listed as sbcglobal.net), the telephone number of the incoming call (in FIG. 5, termed the BTN), the operating system (termed O.S.), the mode (such as 1-line, 2-line, or mobile), etc. The listed BASIC INFORMATION is for illustrative purposes only.

When entering any one, some, or all of the BASIC INFORMATION, a separate portion of the screen may display information relating to the BASIC INFORMATION entered. Specifically, a screen pop up may occur in order to assist the agent contemporaneously with entering the customer information. For example, when entering the domain name, such as sbcglobal.net, a portion of the screen may display guidelines for handing the call as dictated by the particular Internet Service Provider. As another example, after the telephone number of the incoming call is entered, a portion of the screen may display information relating to the access number (such as (1) a listing of access numbers and corresponding information as to whether the number is working; or (2) a listing of access numbers not working). FIG. 5 shows an example of a screen pop relating to access numbers for connectivity to the Internet. In this manner, the agent may be presented with information on the same display screen without having to toggle to any other windows.

Figure 6:
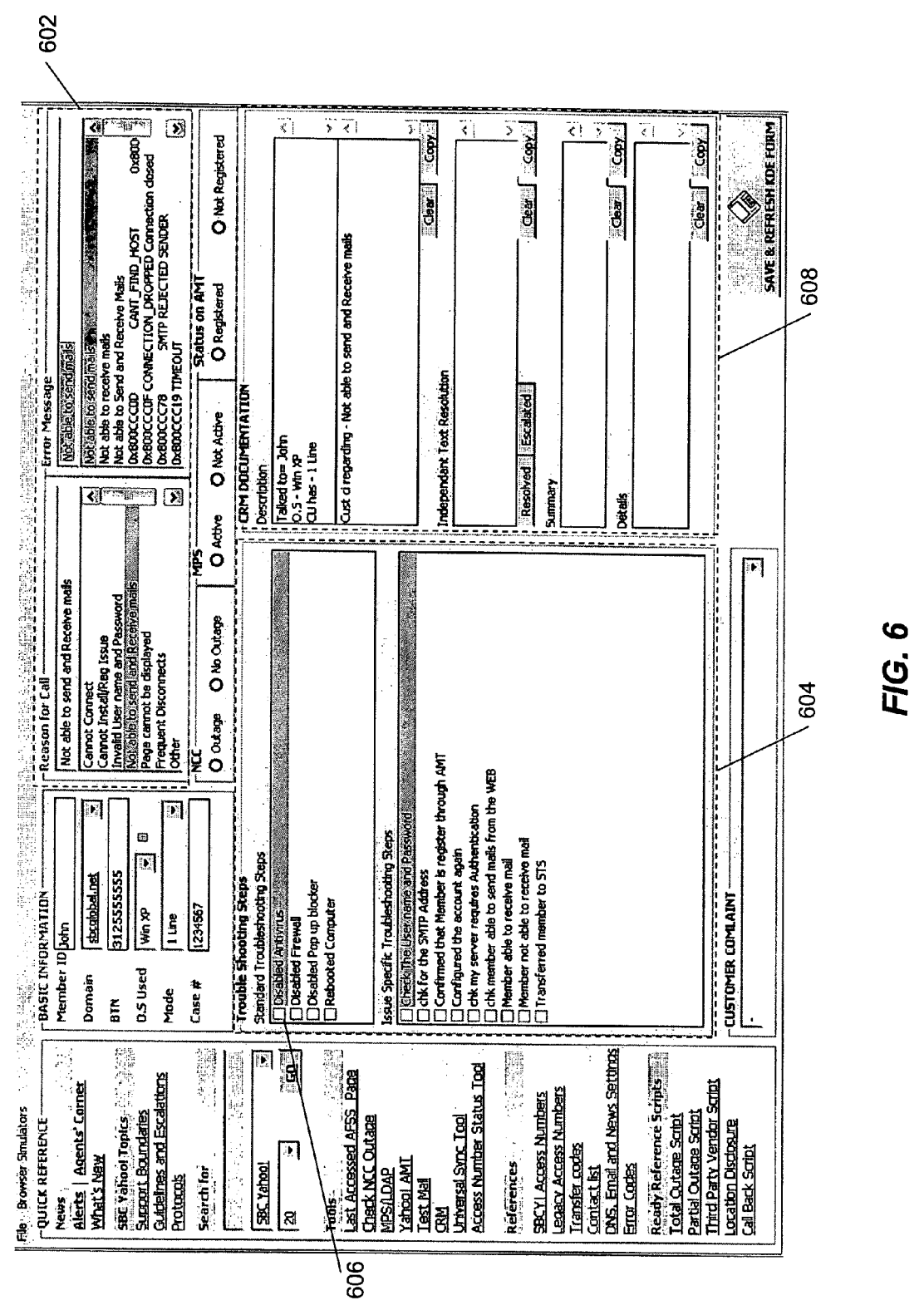

One, some, or all of the BASIC INFORMATION may be manually entered by the agent. For example, the agent may ask the customer what operating system the customer is using. Alternatively, one, some, or all of the BASIC INFORMATION may be automatically entered by the agent. For example, the customer profile may include information regarding the domain used. As shown in FIG. 6, when information is populated in one part of the screen, another part of the screen relating to documentation of the call may automatically be populated. For example, as shown at block 608 of FIG. 6, the information entered in the BASIC INFORMATION portion of the screen is populated in the CRM documentation of the screen. As discussed in more detail below, this automatic population of the documentation for the call may reduce the handle time and may standardize the documentation of calls.

After the additional information is entered on the screen, the agent may also enter the reason(s) for the call or the problem encountered, as shown at block 314. The reason(s) for the call may include the problem encountered by the customer. As shown in FIG. 6, there are several reasons from which the agent may choose. The reasons may be supplemented by specific error messages provided by the electronic device. Typically, when an electronic device is malfunctioning, it provides a specific error message to aid in diagnosing the problem. In the example of the call center for an Internet Service Provider, the agent may enter the reason for the call and the error message, as highlighted in block 602 of FIG. 6.

Based on the reason(s) for the call or the problem encountered, a recommendation to diagnose and/or solve the problem, such as trouble shooting steps, may be determined. Specifically, once the agent captures one, some or all the above details, the applicable troubleshooting steps may be populated in the area highlighted by block 604 in FIG. 6 ("Trouble Shooting Steps"). Populating the troubleshooting steps may be performed by a background program, which may perform one or more of the following functions: (1) monitoring one, some, or all of the inputs provided by the agent (such as the inputs shown in the "BASIC INFORMATION", "Reason for Call", and/or "Error Message" portions of the screen in FIG. 6); (2) determining applicable troubleshooting steps using a decision a decision tree (such as the troubleshooting steps disclosed in FIGS. 9A-W); and (3) displaying the applicable troubleshooting steps (such as in the area highlighted by block 604 in FIG. 6). Once the background program determines troubleshooting steps based on the input data, the background program may automatically display the troubleshooting steps without any explicit input from the agent.

Specifically, the background program need only rely on the input data from the agent, and does not require the user to explicitly enter a command requesting troubleshooting steps.

The background program may display the applicable trouble shooting steps in a variety of ways. For example, the background program may display the applicable troubleshooting steps only after all of the inputs are provided by the agent. As another example, the background program may monitor the inputs provided by the agent, dynamically determining whether there are applicable troubleshooting steps based on the decision tree, even if all of the inputs have not been entered. If the background program determines applicable troubleshooting steps, the applicable troubleshooting steps may be displayed immediately even if all of the inputs have not been entered.

After the trouble shooting steps are determined, they may be displayed in a section of the display screen, as shown at block 316. As shown in FIG. 6, the trouble shooting steps may be displayed in portion of the screen without the need for the agent to toggle between various windows. Specifically, after the problem is diagnosed, the trouble shooting steps may be displayed on the same screen as the agent is currently viewing, thus accelerating presentation of the trouble shooting steps to the agent and potentially reduce the handle time of the call.

FIG. 6 shows the "BASIC INFORMATION", "Reason for Call", "Error Message" and the "Trouble Shooting Steps" portion of the screen are part of the same window. Alternatively, the "BASIC INFORMATION", "Reason for Call", and/or "Error Message" portions of the screen and the "Trouble Shooting Steps" portion of the screen may be in separate windows, with each of the portions shown in their entirety. Therefore, the agent does not need to toggle between different windows (such as from an input window to a suggested trouble shooting steps window) to obtain the trouble shooting information. Moreover, the agent does not need to prompt the background program to display the applicable troubleshooting steps, such as by hitting a button "show troubleshooting steps." Rather, the troubleshooting steps are displayed automatically upon entry of sufficient information in the screen.

In the example of trouble shooting for an internet service provider, the following types of issues may be covered in the Call Center Support and Documentation system 110 when providing troubleshooting and documentation services: authentication related; cannot connect with sync; cannot connect without sync; browsing issues (after being connected); e-mail (cannot send/receive); and phone page related. These problems may contribute to about 70% of the calls that the center receives in the context of providing troubleshooting and documentation services for an ISP.

FIG. 6 is presented merely for illustrative purposes. The trouble shooting steps may be presented in any portion of the screen. Further, one, some, or all of the trouble shooting steps may be immediately presented to the agent on the screen after the trouble shooting steps are determined. As shown in FIG. 6, all of the trouble shooting steps are presented on the display. In the event that there are many troubleshooting steps (such as too many to display on the screen), one or some of the trouble shooting steps, but less than all, may be presented on the current display of the agent. In this manner, the agent may still be able to see at least one or more trouble shooting steps immediately without toggling between windows. As the trouble shooting steps are executed, the display screen may present additional trouble shooting steps (such as scrolling the trouble shooting steps upward).

Figure 7:
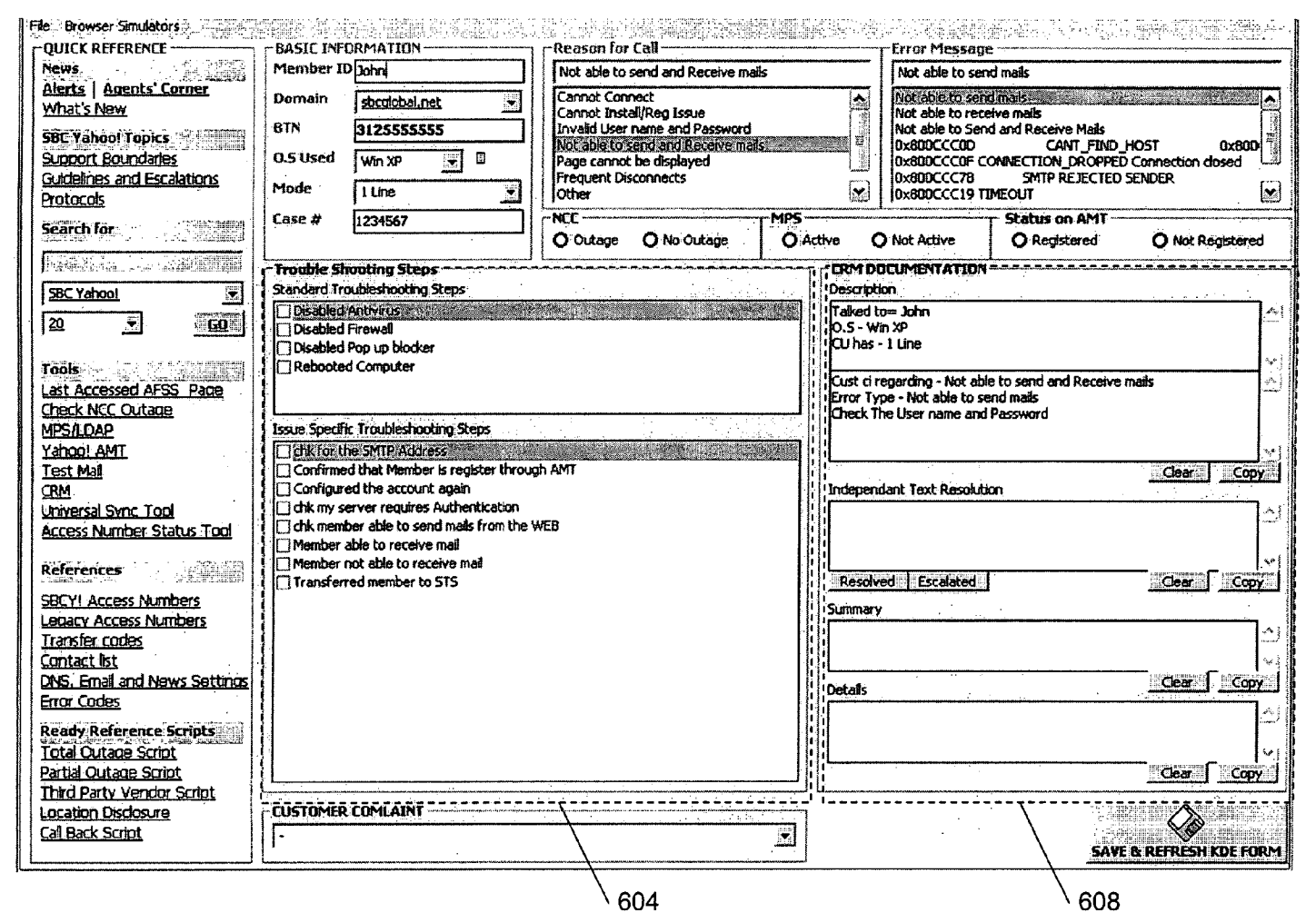

The agent may perform the trouble shooting step(s) and may indicate to the system what step(s) have been performed, as shown at block 318. To indicate that the trouble shooting steps have been performed, the agent may use the mouse 237 and/or keyboard 238. For example, the agent may use the mouse 237 to click on box 606. When the agent indicates that one of the trouble shooting steps has been performed, the indicated trouble shooting step may be removed from the portion of the screen that displays the trouble shooting steps, and may also display performed trouble shooting steps in the documentation portion of the screen, as shown at block 320. For example, if the operator has checked box next to the trouble shooting step "Check The User name and Password," that trouble shooting step is removed from the list of trouble shooting steps, and is added to the documentation portion of the screen. This is shown in FIG. 7. Populating the documentation may be performed by the background program, discussed above, or may be performed by a separate program. Removing the step from the list of trouble shooting steps enables the operator to focus on the remaining trouble shooting steps. Further, adding the step to the documentation portion of the screen (block 608) reduces the time for documentation while still allowing the agent to view what trouble shooting steps have been performed.

Figure 8:
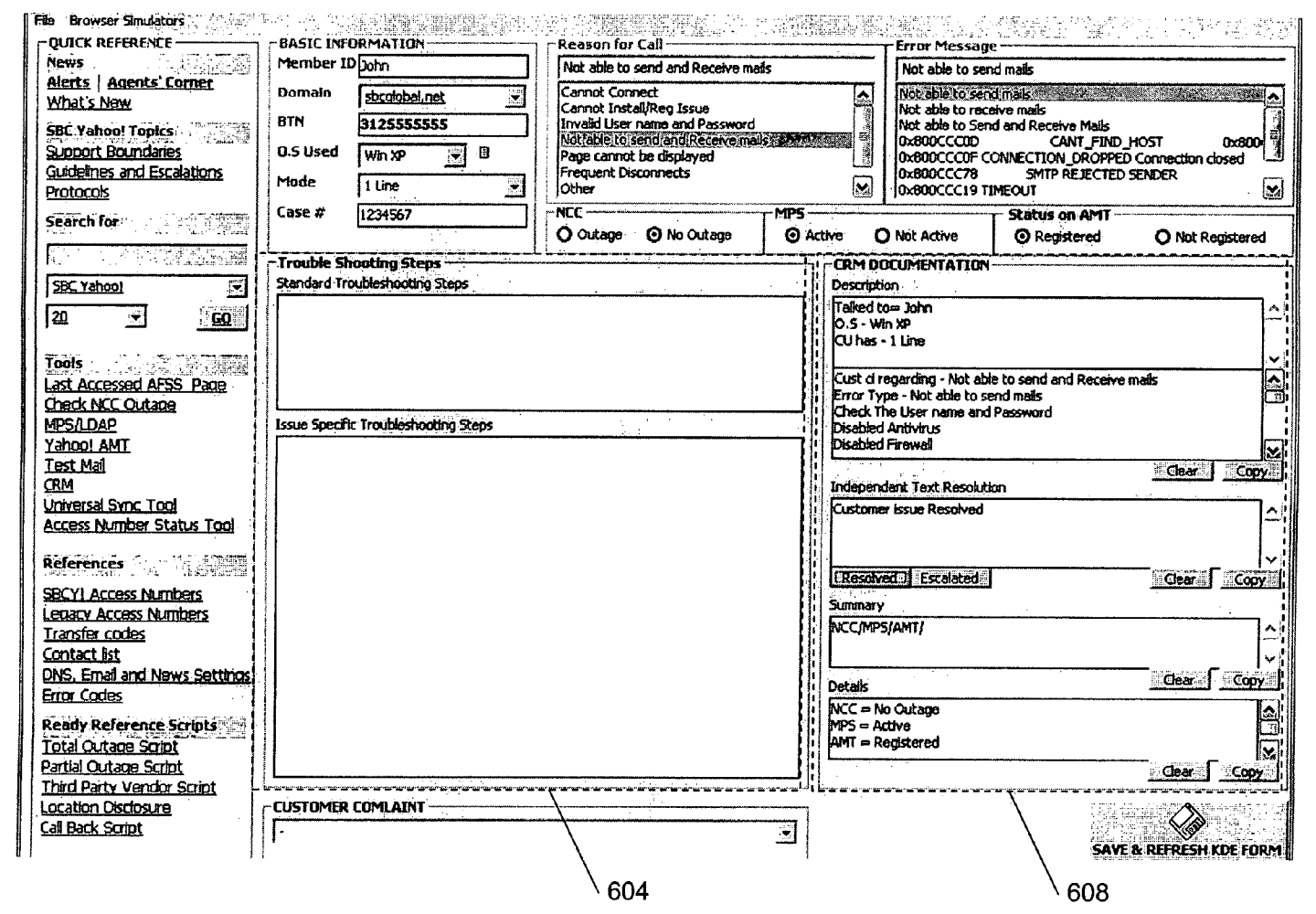

The operator may perform all of the recommended trouble shooting steps, and indicate on the screen via the mouse 237 or keyboard 238 that they have been performed. In this instance, all of the troubleshooting steps are removed from one portion of the screen (as shown in FIG. 8, the Trouble Shooting Steps 604 portion of the screen, and may be displayed in the documentation portion of the screen 608.

Further, the agent may perform diagnostics steps, in addition to the recommended trouble shooting steps, to aid in resolution of the client problem, as shown at block 322. In the Internet Service Provider example, the agent may determine whether there is an outage of any portion of the system. Specifically, the agent may check whether there is a Network Command Center (NCC) outage. To check, the agent may simply click on the "Check NCC Outage" link that is on the main portion of the screen. Again, since the screen presents the link on the display as shown in FIG. 8, the agent need not toggle to a different screen to access the diagnostic tool. Further, once the agent clicks on the link, a part of the screen may provide information as to network outages. Once more, the agent need not toggle between different windows since the information is presented on the current screen. Once the agent performs the additional diagnostic steps (such as determining the NCC status), the agent may indicate it on the screen (such as "Outage" or "No Outage"), as shown at block 324. The agent may also perform other diagnostic steps, such as verify information regarding the customer's account. The diagnostic tool may be accessed by the "Universal Sync Tool" link as shown in FIG. 8. Again, the agent need not toggle between different screens to access the diagnostic tool.

The background program may also populate the CRM documentation portion of the screen with the additional diagnostic steps performed, as shown at block 326. For example, the subsection "Details" under the CRM documentation portion of the screen indicates the result of the NCC analysis (as shown in FIG. 8, NCC=No Outage).

The agent may also indicate the result of the call, such as whether the reason for the call has been resolved or not been resolved, as shown at block 328. As shown in FIG. 8, the agent may indicate in the subsection under "Independent Test Resolution" under the "CRM documentation" portion of the screen whether the problem has been "Resolved" or "Escalated". When the agent indicates whether the problem has been resolved or not, the documentation portion of the screen documents the indication, as shown at block 330. For example, the agent may indicate that the customer issue has been resolved by clicking on the "Resolved" tab. The background program may populate the documentation section with "Customer Issue Resolved" in the subsection under "Independent Test Resolution," as shown in FIG. 8.

Finally, the documentation displayed in the portion of the screen entitled "CRM documentation" may be copied to a database, as shown at block 332. Specifically, this documentation may be copy-pasted into the client's backend application where customer information is stored. As shown in FIG. 8, there are tabs entitled "Copy" in the CRM Documentation portion of the screen. The agent may copy-paste a portion of the data in the CRM Documentation to the client's backend application by clicking of the copy tab. Alternatively, if the agent has access to the backend application, the documentation may be sent to the client's backend application without a separate act of clicking of the copy tab may be unnecessary FIG. 8 illustrates different areas of the screen, such as the "Reason for Call," "Trouble Shooting Steps," and "CRM Documentation" portions of the screen. The amount of the screen that the different areas occupy may be static or may be dynamic. For example, the amount of the screen area for the "Reason for Call," "Trouble Shooting Steps," and "CRM Documentation" may be constant, as shown in FIG. 6. Or, the amount of the screen for any of the different areas may be dynamic. If dynamic, the amount of screen area may be determined in a variety of ways. One way is to vary the amount of screen area during the course of handling a troubleshooting call. For example, the area for agent input may occupy a bigger portion of the screen during a first portion of the troubleshooting call when the agent is inputting the data, and after sufficient data is entered (such as one, some or all of the fields shown in "Reason for Call"), the area for agent input is reduced. Similarly, during the troubleshooting phase of the phone call, the size of the "Trouble Shooting Steps" portion of the screen may be increased. Another way to determine the amount of screen area is to vary the amount of screen area based on the information presented. For example, if the amount of troubleshooting information is large (e.g., if there is too much information to display in the screen portion for "Issue Specific Troubleshooting Steps") that portion of the display may be increased to accommodate the additional information. In this manner, the agent may see all of the relevant information on a single screen without toggling between various windows.

While this invention has been shown and described in connection with the preferred embodiments, it is apparent that certain changes and modifications in addition to those mentioned above may be made from the basic features of this invention. In addition, there are many different types of computer software and hardware that may be utilized in practicing the invention, and the invention is not limited to the examples described above. The invention was described with reference to acts and symbolic representations of operations that are performed by one or more electronic devices. As such, it will be understood that such acts and operations include the manipulation by the processing unit of the electronic device of electrical signals representing data in a structured form. This manipulation transforms the data or maintains it at locations in the memory system of the electronic device, which reconfigures or otherwise alters the operation of the electronic device in a manner well understood by those skilled in the art. The data structures where data is maintained are physical locations of the memory that have particular properties defined by the format of the data. While the invention is described in the foregoing context, it is not meant to be limiting, as those of skill in the art will appreciate that the acts and operations described may also be implemented in hardware. Accordingly, it is the intention of the Applicants to protect all variations and modification within the valid scope of the present invention. It is intended that the invention be defined by the following claims, including all equivalents.

The flow chart in FIGS. 3A-B may be encoded in a signal bearing medium, a computer readable medium such as a memory, programmed within a device such as on one or more integrated circuits, or processed by a controller or a computer. If the methods are performed by software, the software may reside in a memory resident to or interfaced to the Call Center Support and Documentation system 100, a communication interface, or any other type of non-volatile or volatile memory. The memory may include an ordered listing of executable instructions for implementing logical functions. A logical function may be implemented through digital circuitry, through source code, through analog circuitry, or through an analog source such through an analog electrical, audio, or video signal. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine-readable medium," "propagated-signal" medium, and/or "signal-bearing medium" may comprise any means that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

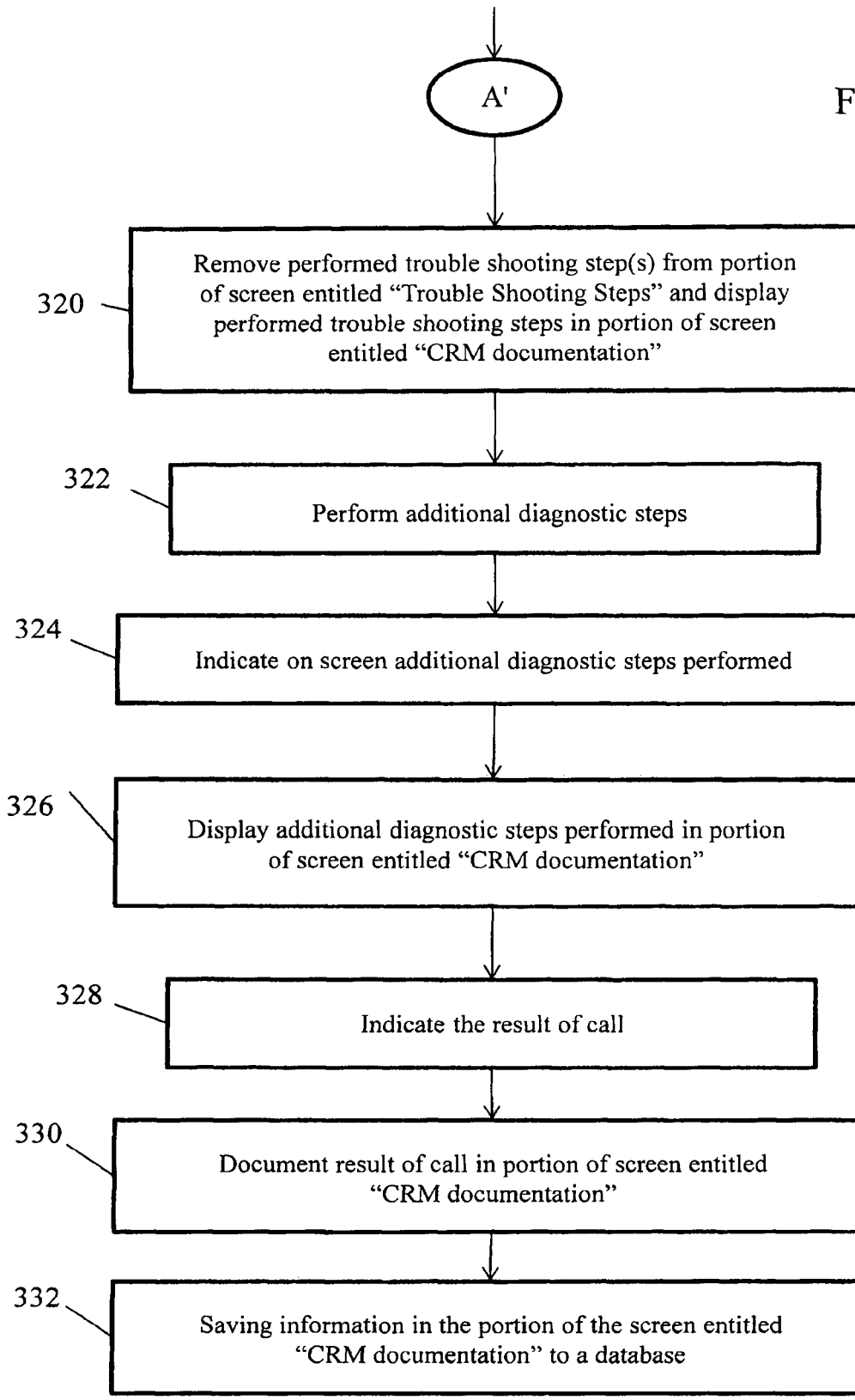

The invention claimed is:

1. A system for presenting data to an agent on a graphical user interface of a computer system, the data comprising input data to troubleshoot a problem and troubleshooting steps to solve the problem, the system comprising:

the graphical user interface comprising a display device; and a processor in communication with the graphical user interface and configured to:

present input form fields in a first portion of the graphical user interface for the agent to input the input data;

present the input data in the first portion of the graphical user interface;

automatically determine based on the input data the troubleshooting steps to solve the problem using a software program operating in a background of the computer system;

present at least some of the troubleshooting steps along with respective check boxes displayed next to the presented troubleshooting steps in a second portion of the graphical user interface;

determine documentation to present based on troubleshooting the problem, at least a part of the documentation being duplicative of the input data presented in the first portion of the graphical user interface or the troubleshooting steps in the second portion of the graphical user interface, the documentation comprising a description section and at least one of a summary section and an independent test resolution section;

present the documentation in a third portion of the graphical user interface, receive an input from the agent indicating to the system that a troubleshooting step of the presented troubleshooting steps has been performed, the input checking the check box next to the trouble shooting step that has been performed; and in response to and only after receiving the input, adding the troubleshooting step that has been performed to the description section of the documentation so that the troubleshooting step that has been performed is simultaneously visible in the second portion and the third portion of the graphical user interface, wherein the first, second, and third portions of the graphical user interface are simultaneously visible in their entirety.

2. The system of claim 1, wherein the first and second portions of the graphical user interface are in a single window.

3. The system of claim 1, wherein all of the troubleshooting steps are presented in the second portion of the graphical user interface.

4. The system of claim 1, wherein the background program comprises a logic tree.

5. The system of claim 1, wherein the processor is further configured to indicate that at least one specific troubleshooting step has been performed; and wherein presenting documentation in the third portion of the screen comprises documenting that the specific troubleshooting step has been performed.

6. The system of claim 5, wherein the processor is further configured to remove the specific troubleshooting step from the second portion of the graphical user interface after it is indicated that the specific troubleshooting step has been performed.

7. The system of claim 1, wherein the first, second and third portions of the graphical user interface are in a single window.

8. The system of claim 1, wherein the troubleshooting steps are presented without requiring the agent to toggle between an input data window and a troubleshooting steps window.

9. The system of claim 1, wherein the problem comprises connectivity to an internet service provider.

10. A method of presenting data to an agent on a graphical user interface of a computer system, the data comprising input data to troubleshoot a problem and troubleshooting steps to solve the problem, the method comprising:

presenting input form fields in a first portion of the graphical user interface for the agent to input the input data;

presenting the input data in the first portion of the graphical user interface;

automatically determining based on the input data the troubleshooting steps to solve the problem using a software program operating in a background of the computer system;

presenting at least some of the troubleshooting steps along with respective check boxes displayed next to the presented troubleshooting steps in a second portion of the graphical user interface;

determining documentation to present based on troubleshooting the problem, at least a part of the documentation being duplicative of the input data presented in the first portion of the graphical user interface or the troubleshooting steps in the second portion of the graphical user interface, the documentation comprising a description section and at least one of a summary section and an independent test resolution section;

presenting the documentation in a third portion of the graphical user interface, receiving an input from the agent indicating to the computer system that a troubleshooting step of the presented troubleshooting steps has been performed, the input checking the check box next to the trouble shooting step that has been performed; and in response to and only after receiving the input, adding the troubleshooting step that has been performed to the description section of the documentation so that the troubleshooting step that has been performed is simultaneously visible in the second portion and the third portion of the graphical user interface, wherein the first, second, and third portions of the graphical user interface are simultaneously visible in their entirety.

11. The method of claim 10, wherein the first and second portions of the graphical user interface are in a single window.

12. The method of claim 10, wherein all of the troubleshooting steps are presented in the second portion of the graphical user interface.

13. The method of claim 10, wherein the background program comprises a logic tree.

14. The method of claim 10, further comprising indicating that at least one specific troubleshooting step has been performed; and wherein presenting documentation in the third portion of the screen comprises documenting that the specific troubleshooting step has been performed.

15. The method of claim 14, further comprising removing the specific troubleshooting step from the second portion of the graphical user interface after it is indicated that the specific troubleshooting step has been performed.

16. The method of claim 10, wherein the first, second and third portions of the graphical user interface are in a single window.

17. The method of claim 10, wherein the troubleshooting steps are presented without requiring the agent to toggle between an input data window and a troubleshooting steps window.

18. The method of claim 10, wherein the problem comprises connectivity to an internet service provider.

19. The system of claim 1, wherein the documentation to present is duplicative of the input data presented in the first portion of the graphical user interface and the troubleshooting steps in the second portion of the graphical user interface.

20. The system of claim 19, wherein at least a part of the documentation duplicated in the third portion comprises information input by the agent and displayed in the first portion.

21. The system of claim 1, wherein the documentation comprises the description section, the summary section and the independent test resolution section.

22. The method of claim 10, wherein the documentation comprises the description section, the summary section and the independent test resolution section.

* * * * *

UNITED STATES PATENT AND TRADEMARK OFFICE
CERTIFICATE OF CORRECTION

Page 1 of 3

PATENT NO. : 7,716,595 B2
APPLICATION NO. : 11/413697
DATED : May 11, 2010
INVENTOR(S) : Joseph et al.

It is certified that error appears in the above-identified patent and that said Letters Patent is hereby corrected as shown below:

In the Figures

Delete Figures 3A and 3B and substitute therefor the drawing sheets consisting of Figures 3A and 3B.

Figures 3A and 3B have been made formal. (see attached)

Signed and Sealed this
Seventh Day of February, 2012

David J. Kappos
*Director of the United States Patent and Trademark Office*